(12) United States Patent
Lim et al.

(10) Patent No.: US 7,625,978 B1
(45) Date of Patent: Dec. 1, 2009

(54) MOISTURE CURABLE SILICONE UREA HOT MELT REINFORCED BY ORGANIC POLYMERS

(75) Inventors: Thomas Fay-Oy Lim, Killingworth, CT (US); David P. Dworak, East Hartford, CT (US); Mathias E. Liistro, Jr., Plainville, CT (US); Hsien-Kun Chu, Wethersfield, CT (US)

(73) Assignee: Henkel Corporation, Rocky Hill, CT (US)

( * ) Notice: Subject to any disclaimer, the term of this patent is extended or adjusted under 35 U.S.C. 154(b) by 432 days.

(21) Appl. No.: 11/553,759

(22) Filed: Oct. 27, 2006

(51) Int. Cl.
*C08L 83/04* (2006.01)
(52) U.S. Cl. ............... 525/100; 525/104; 525/105; 525/477; 528/25; 528/28; 528/29; 528/38
(58) Field of Classification Search .............. None
See application file for complete search history.

(56) References Cited

U.S. PATENT DOCUMENTS

| | | | |
|---|---|---|---|
| 2005/0009985 A1* | 1/2005 | Selbertinger et al. | 524/589 |
| 2007/0232772 A1* | 10/2007 | Ziche et al. | 528/26 |
| 2008/0058460 A1* | 3/2008 | Tonge et al. | 524/494 |

FOREIGN PATENT DOCUMENTS

| | | | |
|---|---|---|---|
| WO | WO 2006/010486 | * | 2/2006 |
| WO | WO 2006/021371 A1 | * | 3/2006 |
| WO | WO 2006/028927 | * | 3/2006 |

* cited by examiner

*Primary Examiner*—Marc S Zimmer
(74) *Attorney, Agent, or Firm*—Steven C. Bauman

(57) ABSTRACT

The present invention provides curable hot melt compositions including reactive polymers, which are reinforced by organic polymers to impart higher tensile strength and elongation to the compositions upon cure. In particular, the present invention provides curable hot melt compositions including a silicone urea based polymer and a reinforcement polymer. In some embodiments, the compositions cure upon exposure to moisture and/or radiation. The compositions may be used, for example, as sealants or adhesives.

3 Claims, 2 Drawing Sheets

MOISTURE CURABLE SILICONE UREA HOT MELT REINFORCED BY ORGANIC POLYMERS

BACKGROUND OF THE INVENTION

1. Field of the Invention

The present invention relates to curable hot melt compositions including silicone urea based polymers, which behave like a thermoplastic polymer until crosslinking transforms them into a thermoset. The silicone urea based polymers are reinforced by organic polymers, which allow tailoring of the physical properties of the composition, including hardness, tensile strength and elongation.

2. Brief Description of Related Technology

Thermoplastic polymers are a well-known and widely used class of polymers. Thermoplastic polymers allow for trial and error in attempts to form them into desired shapes. If the thermoplastic polymer is incorrectly molded, it can be re-heated and set again. However, thermoplastic polymers have the disadvantage that a thermoplastic polymer set in an intended form may lose its shape when subjected to temperatures sufficient to cause softening or flow. This can be disadvantageous when the thermoplastic polymer has been set in a desired shape.

Among known thermoplastic polymers are hot melt adhesives. These polymers remain solid until they are heated to the appropriate temperature to make them flow. Hot melts typically form adhesive bonds with the substrate to which they are applied once the flowable polymer is cooled again to a solid.

Contrary to thermoplastic polymers, thermoset polymers avoid the difficulties associated with thermoplastic polymers in that once they are crosslinked, they retain their shape. Unfortunately, this ability that allows the thermoset polymer to maintain its shape can also be a disadvantage—once the thermoset polymer is set in a particular form, it cannot be changed, even if that particular form is not the intended or desired form. Thus, the thermoset polymer must be set in its correct form the first time it is set.

Rheology control of such compositions has also been a concern. For example, compositions formulated to have a high melting range frequently also have a high viscosity, which can make dispensing of the hot melt difficult. Likewise, the use of a higher molecular weight siloxane in preparation of hot melt compositions can lead to a lower content of hard segments, which can result in poor mechanical properties.

Moreover, hot melt adhesives typically exhibit low tensile strength and elongation, which may be undesirable in some applications.

Accordingly, there is a need for a crosslinkable composition that behaves like a hot melt initially, but when exposed to conditions of cure, transforms into a crosslinked composition. There further is a need for such cured compositions to exhibit high tensile strength and elongation properties. Such compositions should be able to maintain a desired shape without fear of loss of physical properties and structural integrity due to temperature fluctuations.

SUMMARY OF THE INVENTION

A) Curable compositions including reactive polymers A

In one aspect of the present invention there is provided a curable hot melt composition including:

a) a reactive polymer having the Formula A(II):

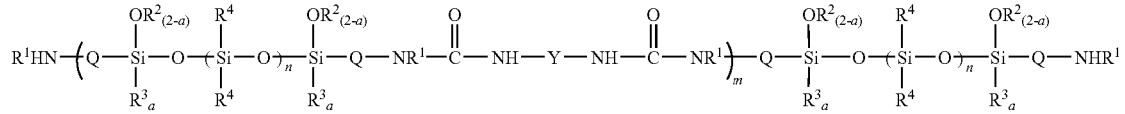

Formula A(II)

where:
$R^1$ in each occurrence may be the same or different and is selected from the group consisting of H and a $C_1$ to $C_{10}$ hydrocarbon radical;
$R^2$ in each occurrence may be the same or different and is a $C_1$ to $C_{10}$ hydrocarbon radical;
$R^3$ in each occurrence may be the same or different and is a $C_1$ to $C_{10}$ hydrocarbon radical;
$R^4$ in each occurrence may be the same or different and is a $C_1$ to $C_{10}$ hydrocarbon radical;
Q in each occurrence may be the same or different and is a $C_1$ to $C_{10}$ hydrocarbon diradical;
Y in each occurrence may be the same or different and is a $C_1$ to $C_{20}$ hydrocarbon diradical;
n in each occurrence may be the same or different and is 1 to about 1,200;
m is 1 to about 100; and
a in each occurrence may be the same or different and is 0 or 1; and b) a reinforcement polymer.

In another aspect of the present invention there is provided a curable hot melt composition including:

a) the reaction product of a diisocyanate and a siloxane having the Formula A(I):

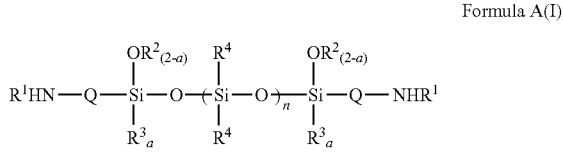

Formula A(I)

where:
$R^1$ is $C_1$ to $C_{10}$ alkyl or H;
$R^2$ is $C_1$ to $C_4$ alkyl;
$R^3$ is $C_1$ to $C_4$ alkyl;
$R^4$ is $C_1$ to $C_4$ alkyl;
Q is a divalent $C_1$-$C_{10}$ alkylene;
n is 1 to 200; and
a is 0 or 1; and b) a reinforcement polymer.

In another aspect of the present invention, there is provided a curable hot melt composition including:

a) the reaction product of a diisocyanate and an aminoalkylenealkoxy terminated polydialkylsiloxane, where the amino portion of the aminoalkylenealkoxy terminated polydialkylsiloxane is a secondary amine; and b) a reinforcement polymer, In yet another aspect of the present invention, there is provided a process for making a moisture curable composition including:
a) providing a mixture of:
i) a first reactant including a diisocyanate; and
ii) a second reactant including an aminoalkylenealkoxy terminated polyalkylsiloxane;
b) reacting the first and second reactants to form a moisture curable polymer; and
c) mixing the moisture curable polymer with a reinforcement polymer to form the moisture curable composition.

In still another aspect of the present invention, there is provided a method of using a curable hot melt adhesive including:
a) providing a sealed container of an adhesive composition including:
i) a reactive polymer of Formula A(II):

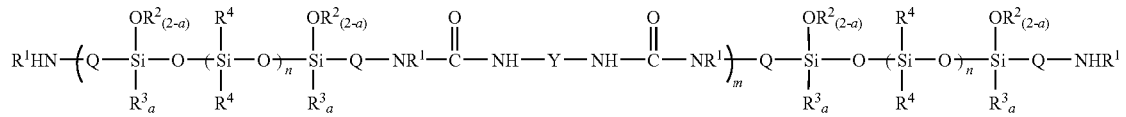

Formula A(II)

where:
R$^1$ in each occurrence may be the same or different and is selected from the group consisting of H and a C$_1$ to C$_{10}$ hydrocarbon radical;
R$^2$ in each occurrence may be the same or different and is a C$_1$ to C$_{10}$ hydrocarbon radical;
R$^3$ in each occurrence may be the same or different and is a C$_1$ to C$_{10}$ hydrocarbon radical;
R$^4$ in each occurrence may be the same or different and is a C$_1$ to C$_{10}$ hydrocarbon radical;
Q in each occurrence may be the same or different and is a C$_1$ to C$_{10}$ hydrocarbon diradical;
Y in each occurrence may be the same or different and is a C$_1$ to C$_{20}$ hydrocarbon diradical;
n in each occurrence may be the same or different and is 1 to about 1,200;
m is 1 to about 100; and
a in each occurrence may be the same or different and is 0 or 1; and
ii) a reinforcement polymer;
b) heating the adhesive to a temperature sufficient to permit dispensing of the adhesive; and
c) dispensing the adhesive onto a substrate and permitting the adhesive to cure.

B) Curable compositions including reactive polymers B
In one aspect of the present invention there is provided a curable hot melt composition including:
a) a reactive polymer of Formula B(I):

where:
R$^1$ in each occurrence may be the same or different and is a member selected from the group consisting of H and a C$_1$ to C$_{10}$ hydrocarbon radical;
R$^6$ in each occurrence may be the same or different and is a member selected from the group consisting of H and a C$_1$ to C$_{10}$ hydrocarbon radical;
T in each occurrence may be the same or different and is:

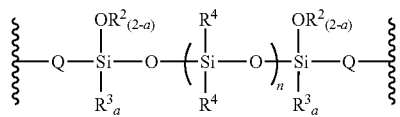

where:
R$^2$ in each occurrence may be the same or different and is a C$_1$ to C$_{10}$ hydrocarbon radical;
R$^3$ in each occurrence may be the same or different and is a C$_1$ to C$_{10}$ hydrocarbon radical;
R$^4$ in each occurrence may be the same or different and is a C$_1$ to C$_{10}$ hydrocarbon radical;
Q in each occurrence may be the same or different and is a C$_1$ to C$_{10}$ hydrocarbon diradical;
n in each occurrence may be the same or different and is 1 to about 1,200; and
a in each occurrence may be the same or different and is 0 or 1;
Y in each occurrence may be the same or different and is a C$_1$ to C$_{20}$ hydrocarbon diradical;
Z in each occurrence may be the same or different and is a C$_1$ to C$_{20}$ hydrocarbon diradical;
X in each occurrence may be the same or different and is a member selected from the group consisting of O, S, and NR$^5$,
where R$^5$ in each occurrence may be the same or different and is a member selected from the group consisting of H, a C$_1$ to C$_{10}$ hydrocarbon radical, and (R$^7$O)$_b$SiR$^8$$_{(3-b)}$—Q—, where:
R$^7$ in each occurrence may be the same or different and is C$_1$ to C$_{10}$ alkyl;
R$^8$ in each occurrence may be the same or different and is C$_1$ to C$_{10}$ alkyl; and

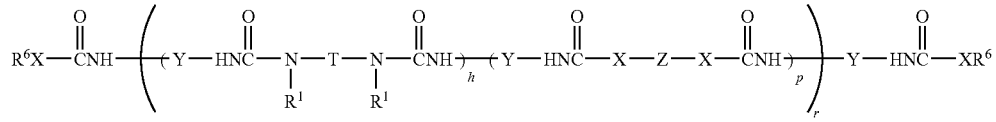

Formula B(I)

b in each occurrence may be the same or different and is 0, 1, or 2;
h is 1 to about 100;
p is 0 to about 100; and
r is 1 to about 100; and
b) a reinforcement polymer.

In another aspect of the present invention, there is provided a curable hot melt composition including:
a) a reactive polymer of Formula B(II):

Formula B (II)

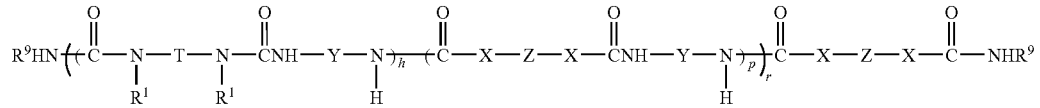

where:
R$^1$ in each occurrence may be the same or different and is a member selected from the group consisting of H and C$_1$ to C$_{10}$ alkyl;
R$^9$ in each occurrence may be the same or different and is a C$_1$ to C$_{10}$ hydrocarbon radical;
T in each occurrence may be the same or different and is:

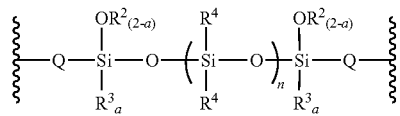

where:
R$^2$ in each occurrence may be the same or different and is C$_1$ to C$_{10}$ hydrocarbon radical;
R$^3$ in each occurrence may be the sane or different and is a C$_1$ to C$_{10}$ hydrocarbon radical;
R$^4$ in each occurrence may be the same or different and is a C$_1$ to C$_{10}$ hydrocarbon radical;
Q in each occurrence may be the same or different and is a C$_1$ to C$_{10}$ hydrocarbon diradical;
n in each occurrence may be the same or different and is 1 to about 1,200; and
a in each occurrence may be the same or different and is 0 or 1;
Y in each occurrence may be the same or different and is a C$_1$ to C$_{20}$ hydrocarbon diradical;
Z in each occurrence may be the same or different and is a C$_1$ to C$_{20}$ hydrocarbon diradical;

X in each occurrence may be the same or different and is a member selected from the group consisting of O, S, and NR$^5$, where R$^5$ in each occurrence may be the same or different and is a member selected from the group consisting of H, a C$_1$ to C$_{10}$ hydrocarbon radical, and (R$^7$O)$_b$SiR$^8_{(3-b)}$—Q—,

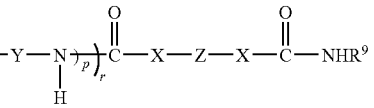

where:
R$^7$ in each occurrence may be the same or different and is C$_1$ to C$_{10}$ alkyl;
R$^8$ in each occurrence may be the same or different and is C$_1$ to C$_{10}$ alkyl;
b in each occurrence may be the same or different and is 0, 1, or 2;
h is 1 to about 100;
p is 0 to about 100; and
r is 1 to about 100; and
b) a reinforcement polymer.

In yet another aspect of the present invention, there is provided a curable hot melt composition including:
a) a reactive polymer of Formula B(III):

Formula B(III)

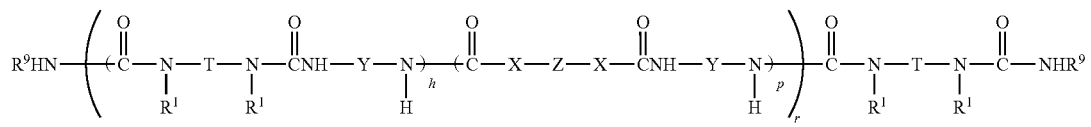

where:
R$^1$ in each occurrence may be the same or different and is a member selected from the group consisting of H and C$_1$ to C$_{10}$ alkyl;
R$^9$ in each occurrence may be the same or different and is a C$_1$ to C$_{10}$ hydrocarbon radical;
T in each occurrence may be the same or different and is:

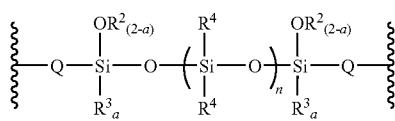

where:
R$^2$ in each occurrence may be the same or different and is a C$_1$ to C$_{10}$ hydrocarbon radical;
R$^3$ in each occurrence may be the same or different and is a C$_1$ to C$_{10}$ hydrocarbon radical
R$^4$ in each occurrence may be the same or different and is a C$_1$ to C$_{10}$ hydrocarbon radical;

Q in each occurrence may be the same or different and is a $C_1$ to $C_{10}$ hydrocarbon diradical;

n in each occurrence may be the same or different and is 1 to about 1,200; and a in each occurrence may be the same or different and is 0 or 1;

Y in each occurrence may be the same or different and is a $C_1$ to $C_{20}$ hydrocarbon diradical;

Z in each occurrence may be the same or different and is a $C_1$ to $C_{20}$ hydrocarbon diradical;

X in each occurrence may be the same or different and is a member selected from the group consisting of O, S, and $NR^5$, where $R^5$ in each occurrence may be the same or different and is a member selected from the group consisting of H, a $C_1$ to $C_{10}$ hydrocarbon radical, and $(R^7O)_b SiR^8{}_{(3-b)}$—Q—, where:
$R^7$ in each occurrence may be the same or different and is $C_1$ to $C_{10}$ alkyl;
$R^8$ in each occurrence may be the same or different and is $C_1$ to $C_{10}$; alkyl;
b in each occurrence may be the same or different and is 0, 1, or 2;

h is 1 to about 100;
p is 0 to about 100; and
r is 1 to about 100; and b) a reinforcement polymer.

In another aspect of the present invention, there is provided a curable hot melt composition including:

a) a reactive polymer of Formula B(IV):

n in each occurrence may be the same or different and is 1 to about 1,200; and a in each occurrence may be the same or different and is 0 or 1;

Y in each occurrence may be the same or different and is a $C_1$ to $C_{20}$ hydrocarbon diradical;

Z in each occurrence may be the same or different and is a $C_1$ to $C_{20}$ hydrocarbon diradical;

X in each occurrence may be the same or different and is a member selected from the group consisting of O, S, and $NR^5$, where $R^5$ in each occurrence may be the same or different and is a member selected from the group consisting of H, a $C_1$ to $C_{10}$ hydrocarbon radical, and $(R^7O)_b SiR^8{}_{(3-b)}$—Q—, where:
$R^7$ in each occurrence may be the same or different and is $C_1$ to $C_{10}$ alkyl;
$R^8$ in each occurrence may be the same or different and is $C_1$ to $C_{10}$ alkyl;
b in each occurrence may be the same or different and is 0, 1, or 2;

h is 1 to about 100;
p is 0 to about 100; and
r is 1 to about 100; and b) a reinforcement polymer.

In another aspect of the present invention, there is provided a curable hot melt composition including:

Formula B(IV)

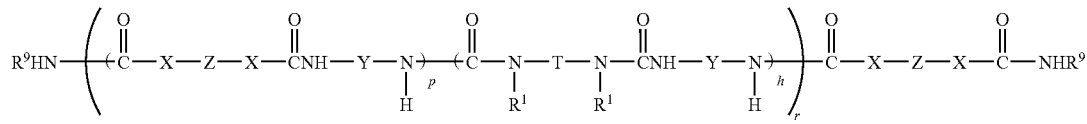

where:
$R^1$ in each occurrence may be the same or different and is a member selected from the group consisting of H and $C_1$ to $C_{10}$ alkyl;
$R^9$ in each occurrence may be the same or different and is a $C_1$ to $C_{10}$ hydrocarbon radical;
T in each occurrence may be the same or different and is:

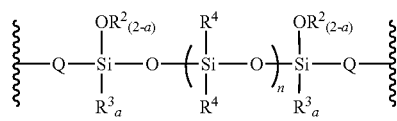

where:
$R^2$ in each occurrence may be the same or different and is a $C_1$ to $C_{10}$ hydrocarbon radical;
$R^3$ in each occurrence may be the same or different and is a $C_1$ to $C_{10}$ hydrocarbon radical;
$R^4$ in each occurrence may be the same or different and is a $C_1$ to $C_{10}$ hydrocarbon radical;
Q in each occurrence may be the same or different and is a $C_1$ to $C_{10}$ hydrocarbon diradical;

a) the reaction product of:
i) a siloxane of the formula:

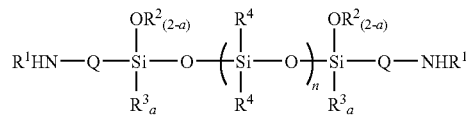

where:
$R^1$ in each occurrence may be the same or different and is a member selected from the group consisting of H and $C_1$ to $C_{10}$ alkyl;
$R^2$ in each occurrence may be the same or different and is a $C_1$ to $C_{10}$ hydrocarbon radical;
$R^3$ in each occurrence may be the same or different and is a $C_1$ to $C_{10}$ hydrocarbon radical;
$R^4$ in each occurrence may be the same or different and is a $C_1$ to $C_{10}$ hydrocarbon radical;
Q is a $C_1$ to $C_{10}$ hydrocarbon diradical;
n is 1 to about 1,200; and
a in each occurrence may be the same or different and is 0 or 1;

ii) a compound having the formula:

OCN—Y—NCO where Y in each occurrence may be the same or different and is a $C_1$ to $C_{20}$ hydrocarbon diradical;
iii) a compound having the formula:

$$HX-Z-XH$$

where:
Z in each occurrence may be the same or different and is a $C_1$ to $C_{20}$ hydrocarbon diradical,
X in each occurrence may be the same or different and is a member selected from the group consisting of O, S, and $NR^5$,
where $R^5$ in each occurrence may be the same or different and is a member selected from the group consisting of H a $C_1$ to $C_{10}$ hydrocarbon radical, and $(R^7O)_b SiR^8{}_{(3-b)}$—Q—
where:
$R^7$ in each occurrence may be the same or different and is $C_1$ to $C_{10}$ alkyl;
$R^8$ in each occurrence may be the same or different and is $C_1$ to $C_{10}$ alkyl;
Q is a $C_1$ to $C_{10}$ hydrocarbon diradical;
n is 1 to about 1,200; and
a in each occurrence may be the same or different and is 0 or 1; and
iv) a compound having the formula;

$$R^6-X-H$$

where:
$R^6$ in each occurrence may be the same or different and is a member selected from the group consisting of H and a $C_1$ to $C_{10}$ hydrocarbon radical; and
X in each occurrence may be the same or different and is a member selected from the group consisting of O, S, and $NR^5$,
where $R^5$ in each occurrence may be the same or different and is a member selected from the group consisting of H, a $C_1$ to $C_{10}$ hydrocarbon radical, and $(R^7O)_b SiR^8{}_{(3-b)}$—Q—
where:
$R^7$ in each occurrence may be the same or different and is $C_1$ to $C_{10}$ alkyl;
$R^8$ in each occurrence may be the same or different and is $C_1$ to $C_{10}$ alkyl;
Q is a $C_1$ to $C_{10}$ hydrocarbon diradical;
n is 1 to about 1,200; and
a in each occurrence may be the same or different and is 0 or 1; and
b) a reinforcement polymer.

In another aspect of the present invention, there is provided a curable hot melt composition including:
a) the reaction product of:
i) a siloxane of the formula:

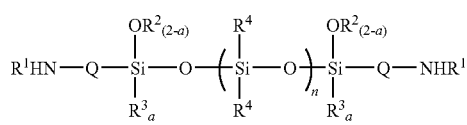

where:
$R^1$ in each occurrence may be the same or different and is a member selected from the group consisting of H and $C_1$ to $C_{10}$ alkyl;
$R^2$ in each occurrence may be the same or different and is a $C_1$ to $C_{10}$ hydrocarbon radical;
$R^3$ in each occurrence may be the same or different and is a $C_1$ to $C_{10}$ hydrocarbon radical;
$R^4$ in each occurrence may be the same or different and is a $C_1$ to $C_{10}$ hydrocarbon radical;
Q is a $C_1$ to $C_{10}$ hydrocarbon diradical;
n is 1 to about 1,200; and
a in each occurrence may be the same or different and is 0 or 1;
ii) a computed having the formula:

$$OCN-Y-NCO$$

where Y in each occurrence may be the same or different and is a $C_1$ to $C_{20}$ hydrocarbon diradical;
iii) a compound having the formula:

$$HX-Z-XH$$

where:
Z in each occurrence may be the same or different and is a $C_1$ to $C_{20}$ hydrocarbon diradical;
X in each occurrence may be the same or different and is a member selected from the group consisting of O, S, and $NR^5$,
where $R^5$ in each occurrence may be the same or different and is a member selected from the group consisting of H, a $C_1$ to $C_{10}$ hydrocarbon radical, and $(R^7O)_b SiR^8{}_{(3-b)}$—Q—
where:
$R^7$ in each occurrence may be the same or different and is $C_1$ to $C_{10}$ alkyl;
$R^8$ in each occurrence may be the same or different and is $C_1$ to $C_{10}$ alkyl;
Q is a $C_1$ to $C_{10}$ hydrocarbon diradical;
n is 1 to about 1,200; and
a in each occurrence may be the same or different and is 0 or 1; and
iv) a compound having the formula:

$$R^9-NCO$$

where $R^9$ in each occurrence may be the same or different and is a $C_1$ to $C_{10}$ hydrocarbon radical; and
b) a reinforcement polymer.

In still another aspect of the present invention, there is provided a method for making a curable composition including:
a) reacting:
i) a siloxane of the formula:

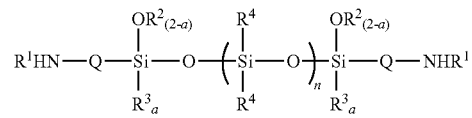

where:
$R^1$ in each occurrence may be the same or different and is a member selected from the group consisting of H and $C_1$ to $C_{10}$ alkyl;
$R^2$ in each occurrence may be the same or different and is a $C_1$ to $C_{10}$ hydrocarbon radical;
$R^3$ in each occurrence may be the same or different and is a $C_1$ to $C_{10}$ hydrocarbon radical;
$R^4$ in each occurrence may be the same or different and is a $C_1$ to $C_{10}$ hydrocarbon radical;
Q is a $C_1$ to $C_{10}$ hydrocarbon diradical;
n is 1 to about 1,200; and a in each occurrence may be the same or different and is 0 or 1;

ii) a compound having the formula:

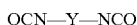
OCN—Y—NCO where Y in each occurrence may be the same or different and is a $C_1$ to $C_{20}$ hydrocarbon diradical;

iii) a compound having the formula:

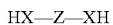
HX—Z—XH where:
Z in each occurrence may be the same or different and is a $C_1$ to $C_{20}$ hydrocarbon diradical;
X in each occurrence may be the same or different and is a member selected from the group consisting of O, S, and $NR^5$,
where $R^5$ in each occurrence may be the same or different and is a member selected from the group consisting of H, a $C_1$ to $C_{10}$ hydrocarbon radical, and $(R^7O)_b SiR^8{}_{(3-b)}$—Q—
where:
$R^7$ in each occurrence may be the same or different and is $C_1$ to $C_{10}$ alkyl;
$R^8$ in each occurrence may be the same or different and is $C_1$ to $C_{10}$ alkyl;
Q is a $C_1$ to $C_{10}$ hydrocarbon diradical;
n is 1 to about 1,200; and
a in each occurrence may be the same or different and is 0 or 1; and iv) a compound having the formula;

$R^6$—X—H where:
$R^6$ in each occurrence may be the same or different and is a member selected from the group consisting of H and a $C_1$ to $C_{10}$ hydrocarbon radical; and
X in each occurrence may be the same or different and is a member selected from the group consisting of O, S, and $NR^5$,
where $R^5$ in each occurrence may be the same or different and is a member selected from the group consisting of H, a $C_1$ to $C_{10}$ hydrocarbon radical, and $(R^7O)_b SiR^8{}_{(3-b)}$—Q—
where:
$R^7$ in each occurrence may be the same or different and is $C_1$ to $C_{10}$ alkyl;
$R^8$ in each occurrence may be the same or different and is $C_1$ to $C_{10}$ alkyl;
Q is a $C_1$ to $C_{10}$ hydrocarbon diradical;
n is 1 to about 1,200; and
a in each occurrence may be the same or different and is 0 or 1; and b) mixing the resulting reaction product with a reinforcement polymer.

In yet another aspect of the present invention, there is provided a method for making a curable composition including:

a) reacting:
i) a siloxane of the formula:

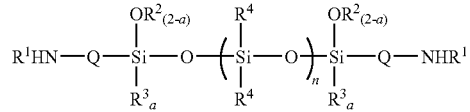

where:
$R^1$ in each occurrence may be the same or different and is a member selected from the group consisting of H and $C_1$ to $C_{10}$ alkyl;
$R^2$ in each occurrence may be the same or different and is a $C_1$ to $C_{10}$ hydrocarbon radical;
$R^3$ in each occurrence may be the same or different and is a $C_1$ to $C_{10}$ hydrocarbon radical;
$R^4$ in each occurrence may be the same or different and is a $C_1$ to $C_{10}$ hydrocarbon radical;
Q is a $C_1$ to $C_{10}$ hydrocarbon diradical;
n is 1 to about 1,200; and
a in each occurrence may be the same or different and is 0 or 1;

ii) a compound having the formula:

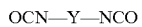
OCN—Y—NCO where Y in each occurrence may be the same or different and is a $C_1$ to $C_{20}$ hydrocarbon diradical;

iii) a compound having the formula:

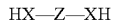
HX—Z—XH where:
Z in each occurrence may be the same or different and is a $C_1$ to $C_{20}$ hydrocarbon diradical;
X in each occurrence may be the same or different and is a member selected from the group consisting of O, S, and $NR^5$,
where $R^5$ in each occurrence may be the same or different and is a member selected from the group consisting of H, a $C_1$ to $C_{10}$ hydrocarbon radical, and $(R^7O)_b SiR^8{}_{(3-b)}$—Q—
where:
$R^7$ in each occurrence may be the same or different and is $C_1$ to $C_{10}$ alkyl;
$R^8$ in each occurrence may be the same or different and is $C_1$ to $C_{10}$ alkyl;
Q is a $C_1$ to $C_{10}$ hydrocarbon diradical;
n is 1 to about 1,200; and
a in each occurrence may be the same or different and is 0 or 1; and iv) a compound having the formula;

$R^9$—NCO where $R^9$ in each occurrence may be the same or different and is a $C_1$ to $C_{10}$ hydrocarbon radical; and b) mixing the resulting reaction product with a reinforcement polymer.

In another aspect of the present invention, there is provided a method of using a curable hot melt composition including:

a) providing a sealed container of a composition including:
i) a reactive polymer of Formula B(I):

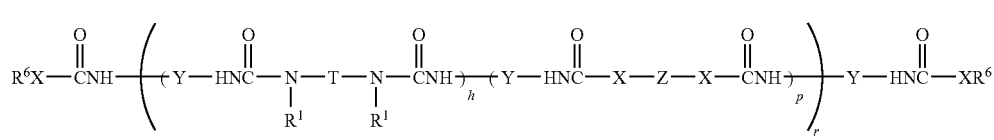

Formula B(I)

where:
R¹ in each occurrence may be the same or different and is a member selected from the group consisting of H and $C_1$ to $C_{10}$ alkyl;
R⁶ in each occurrence may be the same or different and is a member selected from the group consisting of H and a $C_1$ to $C_{10}$ hydrocarbon radical; and
T in each occurrence may be the same or different and is:

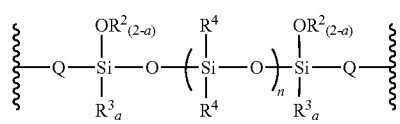

where:
R² in each occurrence may be the same or different and is a $C_1$ to $C_{10}$ hydrocarbon radical;
R³ in each occurrence may be the same or different and is a $C_1$ to $C_{10}$ hydrocarbon radical;
R⁴ in each occurrence may be the same or different and is a $C_1$ to $C_{10}$ hydrocarbon radical;
Q in each occurrence may be the same or different and is a $C_1$ to $C_{10}$ hydrocarbon diradical;
n in each occurrence may be the same or different and is 1 to about 1,200; and
a in each occurrence may be the same or different and is 0 or 1;
Y in each occurrence may be the same or different and is a $C_1$ to $C_{20}$ hydrocarbon diradical;
Z in each occurrence may be the same or different and is a $C_1$ to $C_{20}$ hydrocarbon diradical;
X in each occurrence may be the same or different and is a member selected from the group consisting of O, S, and $NR^5$,
where R⁵ in each occurrence may be the same or different and is a member selected from the group consisting of H, a $C_1$ to $C_{10}$ hydrocarbon radical, and $(R^7O)_b SiR^8_{(3-b)}$—Q—,
where:
R⁷ in each occurrence may be the same or different and is $C_1$ to $C_{10}$ alkyl;
R⁸ in each occurrence may be the same or different and is $C_1$ to $C_{10}$ alkyl;
b in each occurrence may be the same or different and is 0, 1, or 2;
h is 1 to about 100;
p is 0 to about 100; and
r is 1 to about 100; and
ii) a reinforcement polymer;
b) exposing the composition to a temperature sufficient to permit the composition to be flowable; and
c) applying the composition onto a substrate and permitting the composition to cure.
In another aspect of the present invention there is provided a method of using a curable hot melt composition including:
a) providing a sealed container of a composition including:
i) at least one of a reactive polymer of formula B(II), B(III), or B(IV):

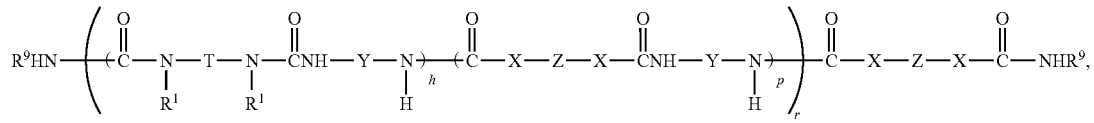

Formula B(II)

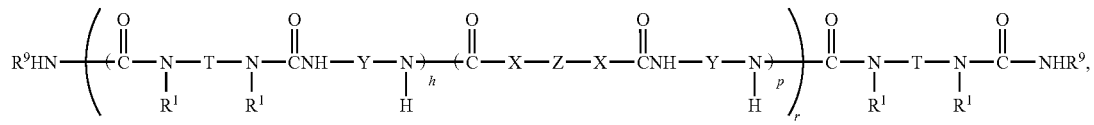

Formula B(III)

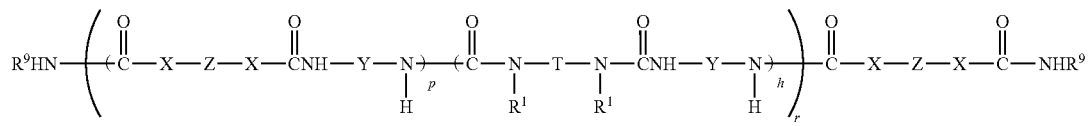

Formula B(IV)

where:
- $R^1$ in each occurrence may be the same or different and is a member selected from the group consisting of H and $C_1$ to $C_{10}$ alkyl;
- $R^9$ in each occurrence may be the same or different and is a $C_1$ to $C_{10}$ hydrocarbon radical;

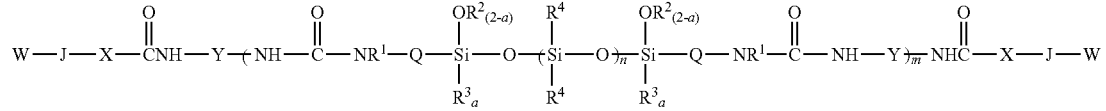

Formula C (I)

T in each occurrence may be the same or different and is:

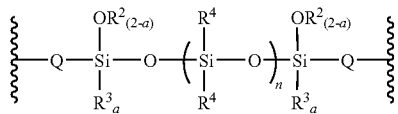

where:
- $R^2$ in each occurrence may be the same or different and is a $C_1$ to $C_{10}$ hydrocarbon radical;
- $R^3$ in each occurrence may be the same or different and is a $C_1$ to $C_{10}$ hydrocarbon radical
- $R^4$ in each occurrence may be the same or different and is a $C_1$ to $C_{10}$ hydrocarbon radical;
  - Q in each occurrence may be the same or different and is a $C_1$ to $C_{10}$ hydrocarbon diradical;
  - n in each occurrence may be the same or different and is 1 to about 1,200; and
  - a in each occurrence may be the same or different and is 0 or 1;
- Y in each occurrence may be the same or different and is a $C_1$ to $C_{20}$ hydrocarbon diradical;
- Z in each occurrence may be the same or different and is a $C_1$ to $C_{20}$ hydrocarbon diradical;
- X in each occurrence may be the same or different and is a member selected from the group consisting of O, S, and $NR^5$,
  - where $R^5$ in each occurrence may be the same or different and is a member selected from the group consisting of H, $C_1$ to $C_{10}$ hydrocarbon radical, and $(R^7O)_b SiR^8_{(3-b)}$—Q—,
    where:
    - $R^7$ in each occurrence may be the same or different and is $C_1$ to $C_{10}$ alkyl;
    - $R^8$ in each occurrence may be the same or different and is $C_1$ to $C_{10}$ alkyl;
    - b in each occurrence may be the same or different and is 0, 1, or 2;
- h is 1 to about 100;
- p is 0 to about 100; and
- r is 1 to about 100; and ii) a reinforcement polymer;

b) exposing the composition of step a) to a temperature sufficient to permit the composition to be flowable; and c) applying the composition of step b) onto a substrate and permitting the composition to cure.

C) Curable compositions including reactive polymers C

In one aspect of the present invention there is provided a curable hot melt composition including:

a) a reactive polymer of Formula C(I):

where:
- $R^1$ in each occurrence may be the same or different and is a member selected from the group consisting of H and a $C_1$ to $C_{10}$ hydrocarbon radical;
- $R^2$ in each occurrence may be the same or different and is a $C_1$ to $C_{10}$ hydrocarbon radical;
- $R^3$ in each occurrence may be the same or different and is a $C_1$ to $C_{10}$ hydrocarbon radical;
- $R^4$ in each occurrence may be the same or different and is a $C_1$ to $C_{10}$ hydrocarbon radical;
- J in each occurrence may be the same or different and is a $C_1$ to $C_{10}$ hydrocarbon diradical;
- X in each occurrence can be the same or different and is a member selected from the group consisting of O, S, and $NR^{10}$,
  - where $R^{10}$ in each occurrence may be the same or different and is a member selected from the group consisting of H and a $C_1$ to $C_{10}$ hydrocarbon radical;
- Y in each occurrence may be the same or different and is a $C_1$ to $C_{20}$ hydrocarbon diradical;
- W in each occurrence may be the same or different and is $C_2$ to $C_{10}$ hydrocarbon radical capable of free-radical polymerization containing at least one of: a double bond, a carbonyl group, or an epoxide group;
- Q in each occurrence may be the same or different and is a $C_1$ to $C_{10}$ hydrocarbon diradical;
- n in each occurrence may be the same or different and is 1 to about 1,200;
- m is 1 to about 100; and
- a in each occurrence may be the same or different and is 0 or 1; and b) a reinforcement polymer.

In another aspect of the present invention, there is provided a curable hot melt composition including:

a) a reactive polymer of Formula C(III):

$$W-J-NH-\overset{O}{\underset{\|}{C}}-NR^1\!\!+\!\!Q-\underset{\underset{a}{R^3}}{\overset{OR^2_{(2-a)}}{\underset{|}{Si}}}-O\!\!+\!\!\underset{R^4}{\overset{R^4}{\underset{|}{Si}}}-O\!\!+\!\!_n\underset{\underset{a}{R^3}}{\overset{OR^2_{(2-a)}}{\underset{|}{Si}}}-Q-NR^1-\overset{O}{\underset{\|}{C}}-NH-Y-NH-$$

$$-\overset{O}{\underset{\|}{C}}-NR^1\!\!\xrightarrow{}_m Q-\underset{\underset{a}{R^3}}{\overset{OR^2_{(2-a)}}{\underset{|}{Si}}}-O\!\!+\!\!\underset{R^4}{\overset{R^4}{\underset{|}{Si}}}-O\!\!+\!\!_n\underset{\underset{a}{R^3}}{\overset{OR^2_{(2-a)}}{\underset{|}{Si}}}-Q-NR^1-\overset{O}{\underset{\|}{C}}-NH-J-W$$

Formula C (III)

where:
J in each occurrence may be the same or different and is a $C_1$ to $C_{10}$ hydrocarbon diradical;
Y in each occurrence may be the same or different and is a $C_1$ to $C_{20}$ hydrocarbon diradical;
W in each occurrence may be the same or different and is a $C_2$ to $C_{10}$ hydrocarbon radical capable of free-radical polymerization containing at least one of: a double bond, a carbonyl group, or an epoxide group;
Q in each occurrence may be the same or different and is a $C_1$ to $C_{10}$ hydrocarbon diradical;
$R^1$ in each occurrence may be the same or different and is a member selected from the group consisting of H and a $C_1$ to $C_{10}$ hydrocarbon radical;
$R^2$ in each occurrence may be the same or different and is a $C_1$ to $C_{10}$ hydrocarbon radical;
$R^3$ in each occurrence may be the same or different and is a $C_1$ to $C_{10}$ hydrocarbon radical;
$R^4$ in each occurrence may be the same or different and is a member selected from the group consisting of H and a $C_1$ to $C_{10}$ hydrocarbon radical;
n in each occurrence may be the same or different and is 1 to about 1,200;
m is 1 to about 100; and
a in each occurrence may be the same or different and is 0 or 1; and
b) a reinforcement polymer.

In yet another aspect of the present invention, there is provided a curable hot melt composition including:
a) the reaction product of:
i) a composition of Formula C(IV):

$R^4$ in each occurrence may be the same or different and is a $C_1$ to $C_{10}$ hydrocarbon radical;
n in each occurrence may be the same or different and is 1 to about 1,200;
m is 1 to about 100; and
a in each occurrence may be the same or different and is 0 or 1; and
ii) a compound having the structure:

$$W-J-X-H$$

where:
J in each occurrence may be the same or different and is a $C_1$ to $C_{10}$ hydrocarbon diradical;
X in each occurrence may be the same or different and is a member selected from the group consisting of O, S, and $NR^{10}$,
where $R^{10}$ in each occurrence may be the same or different and is a member selected from the group consisting of H and a $C_1$ to $C_{120}$ hydrocarbon radical;
W in each occurrence may be the same or different and is $C_2$ to $C_{10}$ hydrocarbon radical capable of free-radical polymerization containing at least one of: a double bond, a carbonyl group, or an epoxide group; and
b) a reinforcement polymer.

In another aspect of the present invention, there is provided a curable hot melt composition including:

$$OCN-Y\!\!+\!\!NH-\overset{O}{\underset{\|}{C}}-NR^1-Q-\underset{\underset{a}{R^3}}{\overset{OR^2_{(2-a)}}{\underset{|}{Si}}}-O\!\!+\!\!\underset{R^4}{\overset{R^4}{\underset{|}{Si}}}-O\!\!+\!\!_n\underset{\underset{a}{R^3}}{\overset{OR^2_{(2-a)}}{\underset{|}{Si}}}-Q-NR^1-\overset{O}{\underset{\|}{C}}-NH-Y\!\!\xrightarrow{}_m NCO$$

Formula C (IV)

where:
Y in each occurrence may be the same or different and is a $C_1$ to $C_{20}$ hydrocarbon diradical;
Q in each occurrence may be the same or different and is a $C_1$ to $C_{10}$ hydrocarbon diradical;
$R^1$ in each occurrence may be the same or different and is a member selected from the group consisting of H and a $C_1$ to $C_{10}$ hydrocarbon radical;
$R^2$ in each occurrence may be the same or different and is a $C_1$ to $C_{10}$ hydrocarbon radical;
$R^3$ in each occurrence may be the same or different and is $C_1$ to $C_{10}$ hydrocarbon radical;

a) the reaction product of:
i) a composition having the formula:

$$R^1HN-Q-\underset{\underset{a}{R^3}}{\overset{OR^2_{(2-a)}}{\underset{|}{Si}}}-O\!\!+\!\!\underset{R^4}{\overset{R^4}{\underset{|}{Si}}}-O\!\!+\!\!\underset{\underset{a}{R^3}}{\overset{OR^2_{(2-a)}}{\underset{|}{Si}}}-Q-NR^1H$$

where:
Q in each occurrence may be the same or different and is a $C_1$ to $C_{10}$ hydrocarbon diradical;

$R^1$ in each occurrence may be the same or different and is a member selected from the group consisting of H and a $C_1$ to $C_{10}$ hydrocarbon radical;

$R^2$ in each occurrence may be the same or different and is a $C_1$ to $C_{10}$ hydrocarbon radical;

$R^3$ in each occurrence may be the same or different and is a $C_1$ to $C_{10}$ hydrocarbon radical;

$R^4$ in each occurrence may be the same or different and is a $C_1$ to $C_{10}$ hydrocarbon radical; and n in each occurrence may be the same or different and is 1 to about 1,200;

ii) a compound having the structure:

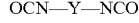

where Y is a $C_1$ to $C_{20}$ hydrocarbon diradical; and iii) a compound having the formula:

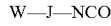

where:

J in each occurrence may be the same or different and is a $C_1$ to $C_{10}$ hydrocarbon diradical;

W is a $C_2$ to $C_{10}$ hydrocarbon radical capable of free-radical polymerization containing at least one of: a double bond, a carbonyl group, or an epoxide group; and b) a reinforcement polymer.

In another aspect of the present invention, there is provided a curable hot melt composition including:

a) the reaction product of:

i) a composition of Formula C(V):

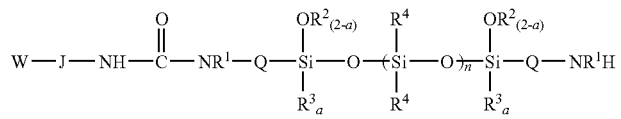

where:

J in each occurrence may be the same or different and is a $C_1$ to $C_{10}$ hydrocarbon diradical;

W is a $C_2$ to $C_{10}$ hydrocarbon radical capable of free-radical polymerization containing at least one of: a double bond, a carbonyl group, or an epoxide group Q in each occurrence may be the same or different and is a $C_1$ to $C_{10}$ hydrocarbon diradical;

$R^1$ in each occurrence may be the same or different and is a member selected from the group consisting of H and a $C_1$ to $C_{10}$ hydrocarbon radical;

$R^2$ in each occurrence may be the same or different and is a $C_1$ to $C_{10}$ hydrocarbon radical;

$R^3$ in each occurrence may be the same or different and is a $C_1$ to $C_{10}$ hydrocarbon radical;

$R^4$ in each occurrence may be the same or different and is a $C_1$ to $C_{10}$ hydrocarbon radical; and n in each occurrence may be the same or different and is 1 to about 1,200; and ii) a compound having the structure:

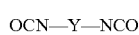

where Y is a $C_1$ to $C_{20}$ hydrocarbon diradical; and b) a reinforcement polymer.

In another aspect of the present invention, there is provided a method for making a curable composition including:

a) reacting:

i) a composition having the formula:

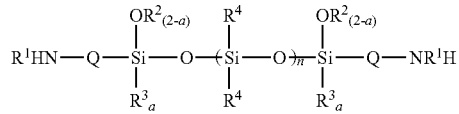

where:

Q in each occurrence may be the same or different and is a $C_1$ to $C_{10}$ hydrocarbon diradical;

$R^1$ in each occurrence may be the same or different and is a member selected from the group consisting of H and a $C_1$ to $C_{10}$ hydrocarbon radical;

$R^2$ in each occurrence may be the same or different and is a $C_1$ to $C_{10}$ hydrocarbon radical;

$R^3$ in each occurrence may be the same or different and is a $C_1$ to $C_{10}$ hydrocarbon radical;

$R^4$ in each occurrence may be the same or different and is a $C_1$ to $C_{10}$ hydrocarbon radical; and n in each occurrence may be the same or different and is 1 to about 1,200; with ii) a compound having the formula:

where Y is a $C_1$ to $C_{20}$ hydrocarbon diradical:

Formual C (V)

b) reacting the reaction product of step a) with a compound having the structure:

where:

J in each occurrence may be the same or different and is a $C_1$ to $C_{10}$ hydrocarbon diradical;

X in each occurrence may be the same or different and is a member selected from the group consisting of O, S, and $NR^{10}$, where $R^{10}$ in each occurrence may be the same or different and is a member selected from the group consisting of H and a $C_1$ to $C_{10}$ hydrocarbon radical; and W in each occurrence may be the same or different and is a $C_2$ to $C_{10}$ hydrocarbon radical capable of free-radical polymerization containing at least one of: a double bond, a carbonyl group, or an epoxide group; and c) mixing the reaction product of step b) with a reinforcement polymer.

In yet another aspect of the present invention, there is provided a method for making a curable composition including:

a) reacting:
i) a composition having the formula:

$$R^1HN-Q-\underset{\underset{R^3{}_a}{|}}{\overset{\overset{OR^2{}_{(2-a)}}{|}}{Si}}-O-(\underset{\underset{R^4}{|}}{\overset{\overset{R^4}{|}}{Si}}-O)_{\overline{m}}\underset{\underset{R^3{}_a}{|}}{\overset{\overset{OR^2{}_{(2-a)}}{|}}{Si}}-Q-NR^1H$$

where:
- Q in each occurrence may be the same or different and is a $C_1$ to $C_{10}$ hydrocarbon diradical;
- $R^1$ in each occurrence may be the same or different and is a member selected from the group consisting of H and a $C_1$ to a $C_{10}$ hydrocarbon radical;
- $R^2$ in each occurrence may be the same or different and is a $C_1$ to $C_{10}$ hydrocarbon radical,
- $R^3$ in each occurrence may be the same or different and is a $C_1$ to $C_{10}$ hydrocarbon radical;
- $R^4$ in each occurrence may be the same or different and is a $C_1$ to $C_{10}$ hydrocarbon radical; and
- n in each occurrence may be the same or different and is 1 to about 1,200;

ii) a compound having the structure:

$$W-J-NCO$$

where:
- J in each occurrence may be the same or different and is a $C_1$ to $C_{10}$ hydrocarbon diradical;
- W is a $C_2$ to $C_{10}$ hydrocarbon radical capable of free-radical polymerization containing at least one of: a double bond, a carbonyl group, or an epoxide group; and iii) a compound having the structure:

$$OCN-Y-NCO$$

where Y is a $C_1$ to $C_{20}$ hydrocarbon diradical; and b) mixing the reaction product of step a) with a reinforcement polymer.

In another aspect of the present invention, there is provided a method of using a curable composition including:

a) providing a sealed container of a composition including:
i) a reactive polymer of Formula C(I):

- X in each occurrence may be the same or different and is a member selected from the group consisting of O, S, and $NR^{10}$,
  - where $R^{10}$ in each occurrence may be the same or different and is a $C_1$ to $C_4$ hydrocarbon radical;
- Y in each occurrence may be the same or different and is a $C_1$ to $C_{20}$ hydrocarbon diradical;
- W in each occurrence may be the same or different and is a $C_2$ to $C_{10}$ hydrocarbon radical capable of free-radical polymerization containing at least one of: a double bond, a carbonyl group, or an epoxide group;
- Q in each occurrence may be the same or different and is a $C_1$ to $C_{10}$ hydrocarbon diradical;
- $R^1$ in each occurrence may be the same or different and is a member selected from the group consisting of H and a $C_1$ to $C_{10}$ hydrocarbon radical;
- $R^2$ in each occurrence may be the same or different and is a $C_1$ to $C_{10}$ hydrocarbon radical;
- $R^3$ in each occurrence may be the same or different and is a $C_1$ to $C_{10}$ hydrocarbon radical;
- $R^4$ in each occurrence may be the same or different and is a $C_1$ to $C_{10}$ hydrocarbon radical;
- n in each occurrence may be the same or different and is 1 to about 1,200; and
- m is 1 to about 100; and ii) a reinforcement polymer;

b) heating the composition of step a) to a temperature sufficient to permit dispensing of the composition; and c) dispensing the composition onto a substrate and permitting the composition to cure.

In still another aspect of the present invention, there is provided a method of using a curable composition including:

Formula C (I)

$$W-J-X-\overset{\overset{O}{\|}}{C}NH-Y-(NH-\overset{\overset{O}{\|}}{C}-NR^1-Q-\underset{\underset{R^3{}_a}{|}}{\overset{\overset{OR^2{}_{(2-a)}}{|}}{Si}}-O-(\underset{\underset{R^4}{|}}{\overset{\overset{R^4}{|}}{Si}}-O)_{\overline{n}}\underset{\underset{R^3{}_a}{|}}{\overset{\overset{OR^2{}_{(2-a)}}{|}}{Si}}-Q-NR^1-\overset{\overset{O}{\|}}{C}-NH-Y)_{\overline{m}}NH\overset{\overset{O}{\|}}{C}-X-J-W$$

where:
- J in each occurrence may be the same or different and is a $C_1$ to $C_{10}$ hydrocarbon diradical;

a) providing a sealed container of a composition including:

i) a reactive polymer of Formula C(III):

Formula C (III)

$$W-J-NH-\overset{\overset{O}{\|}}{C}-NR^1-(Q-\underset{\underset{R^3{}_a}{|}}{\overset{\overset{OR^2{}_{(2-a)}}{|}}{Si}}-O-(\underset{\underset{R^4}{|}}{\overset{\overset{R^4}{|}}{Si}}-O)_{\overline{n}}\underset{\underset{R^3{}_a}{|}}{\overset{\overset{OR^2{}_{(2-a)}}{|}}{Si}}-Q-NR^1-\overset{\overset{O}{\|}}{C}-NH-Y-NH-$$

$$-\overset{\overset{O}{\|}}{C}-NR^1)_{\overline{m}}Q-\underset{\underset{R^3{}_a}{|}}{\overset{\overset{OR^2{}_{(2-a)}}{|}}{Si}}-O-(\underset{\underset{R^4}{|}}{\overset{\overset{R^4}{|}}{Si}}-O)_{\overline{n}}\underset{\underset{R^3{}_a}{|}}{\overset{\overset{OR^2{}_{(2-a)}}{|}}{Si}}-Q-NR^1-\overset{\overset{O}{\|}}{C}-NH-J-W$$

where:
- J in each occurrence may be the same or different and is a $C_1$ to $C_{10}$ hydrocarbon diradical;
- Y in each occurrence may be the same or different and is a $C_1$ to $C_{20}$ hydrocarbon diradical;
- W in each occurrence may be the same or different and is a $C_2$ to $C_{10}$ hydrocarbon radical capable of free-radical polymerization containing at least one of: a double bond, a carbonyl group, or an epoxide group;
- Q in each occurrence may be the same or different and is a $C_1$ to $C_{10}$ hydrocarbon diradical;
- $R^1$ in each occurrence may be the same or different and is a member selected from the group consisting of H and a $C_1$ to $C_{10}$ hydrocarbon radical:
- $R^2$ in each occurrence may be the same or different and is a $C_1$ to $C_{10}$ hydrocarbon radical;
- $R^3$ in each occurrence may be the same or different and is a $C_1$ to $C_{10}$ hydrocarbon radical; and
- $R^4$ in each occurrence may be the same or different and is a $C_1$ to $C_{10}$ hydrocarbon radical;
  - n in each occurrence may be the same or different and is 1 to about 1,200; and
  - m is 1 to about 100; and
- ii) a reinforcement polymer;
- b) heating the composition of step a) to a temperature sufficient to permit dispensing of the composition; and
- c) dispensing the composition of step a) onto a substrate and permitting the composition to cure.

DETAILED DESCRIPTION OF THE INVENTION

Figure 2:
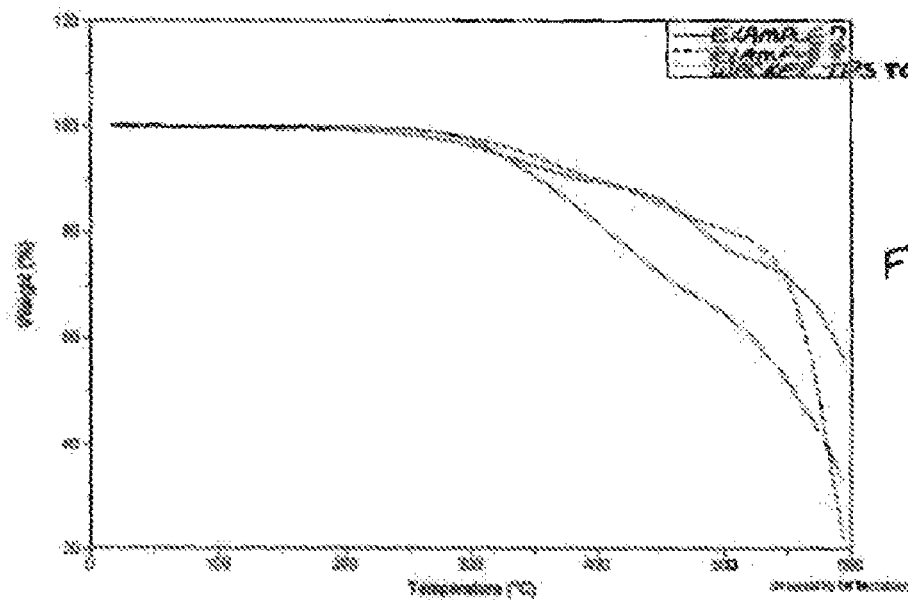
FIG. 2 is a graphic representation of thermogravimetric analysis performed on two inventive compositions (labeled on the graph as Example 7 and 8) including a reactive polymer of Formula A as compared to a commercially available thermoplastic silicone labeled on the graph as WACKER TPSTO).
Figure 1:
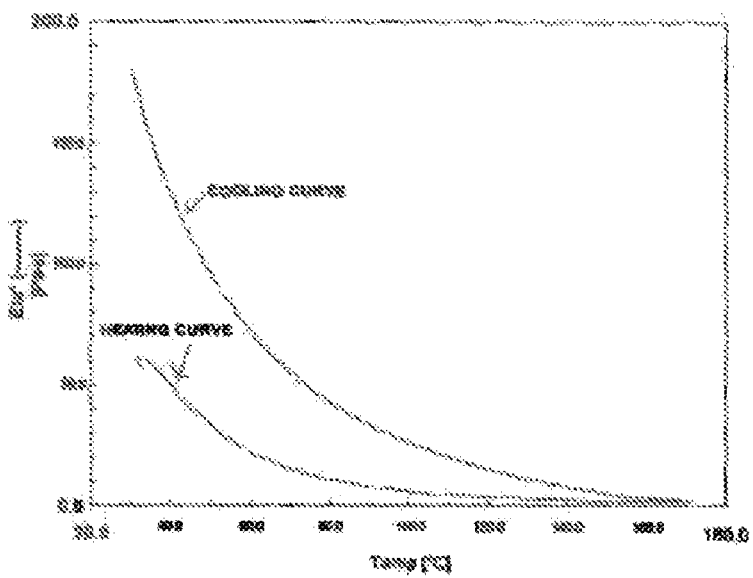
FIG. 1 is a graphic representation of the viscosity/temperature relationship during heating and cooling of a composition of the present invention including a reactive polymer of Formula A.

The curable hot melt compositions of the present invention include silicone urea polymers, which are capable of curing to form a crosslinked composition, and a reinforcement polymer. The reinforcement polymer can be used to tailor the physical properties of the cured composition, such as imparting higher tensile strength and elongation.

The compositions of the present invention are designed to be heated during use such that they can be rendered flowable and be dispensed from their container. In this sense they are similar to conventional thermoplastic hot melts. In contrast to conventional thermoplastic hot melts, however, once the composition is exposed to curing conditions, e.g., moisture or radiation, the composition will cure, i.e., crosslink, to form a thermoset material. Thus, prior to use, the inventive compositions are packaged in containers or dispensers which are substantially impermeable to air and moisture in order to prevent premature cure. The compositions desirably are in the non-flowable form, i.e., solid or semi-solid form, in the sealed container, the container being capable of being heated to render the inventive composition contained within dispensable. The amount of composition to be dispensed can be appropriately metered onto a desired substrate and then allowed to moisture cure under ambient conditions. Any composition remaining in the sealed container or dispenser can be allowed to cool and resolidify for future use. Thus, a convenient, curable hot melt composition is achieved, which exhibits improved physical properties.

These inventive compositions are useful in a variety of end-use applications, such as adhesives, sealants and gasketing applications, as well as other uses in the electronic, automotive and consumer markets.

The term "cure" or "curing," as used herein, refers to a change in state, condition, and/or structure in a material that is usually, but not necessarily, induced by at least one variable, such as time, temperature, moisture, radiation, presence and quantity in such material of a curing catalyst or accelerator, or the like. The terms cover partial as well as complete curing.

As used herein, the terms "hydrocarbon radical" and "hydrocarbon diradical" are intended to refer to radicals and diradicals, respectively, which are primarily composed of carbon and hydrogen atoms. Thus, the terms encompass aliphatic groups such as alkyl, alkenyl, and alkynyl groups; aromatic groups such as phenyl; and alicyclic groups, such as cycloalkyl and cycloalkenyl.

Hydrocarbon radicals and diradicals of the invention may include heteroatoms to the extent that the heteroatoms do not detract from the hydrocarbon nature of the groups. Accordingly, hydrocarbon groups may contain heteroatoms such as halogens, oxygen, nitrogen, and sulfur. Thus, hydrocarbon groups may include such functional groups as ethers, alkoxides, carbonyls, esters, amino groups, amido groups, cyano groups, sulfides, sulfates, sulfoxides, and sulfones.

As mentioned above, the curable hot melt compositions of the present invention include a silicone urea based polymer and a reinforcement polymer. The silicone urea based polymer may be any of the reactive polymers described in detail below, i.e., reactive polymers of Formulas A(II), B(I), B(II), B(III), B(IV), C(I) and C(III).

The reinforcement polymer is an organic polymer that imparts improved physical properties to the hot melt composition, such as tensile strength and elongation, upon curing. Suitable reinforcement polymers include monomers, such as (meth)acrylate ester monomers, alkylene monomers and isocyanate monomers. Combinations of any of these monomers also may be employed.

The reinforcement polymer also may be a copolymer or a terpolymer. Examples of such reinforcement polymers include, but are not limited to, ethylene/acrylic polymers, polydimethylsiloxane/urea polymers, styrene-butadiene-styrene polymers, styrene-ethylene/propylene-styrene polymers and polychloroprene polymers. Combinations of any of these polymers also may be employed.

Examples of suitable commercially available materials for use as reinforcement polymers in the compositions described herein include: ethylene acrylic elastomers sold under the trade name VAMAC, such as VAMAC G, by DuPont, Wilmington, Del.; styrenic block copolymers sold under the trade name KRATON, such as KRATON G, which have a saturated mid-block (styrene-ethylene/butylenes-styrene and styrene-ethylene/propylene-styrene), and KRATON FG, which are KRATON G polymers grafted with functional groups, such as maleic anhydride, all sold by Kraton Polymers LLC, Houston, Tex.; silicone block copolymers sold under the trade name GENIOMER 80, which includes polydimethylsiloxane and isocyanate (urea) phases, by Wacker Silicones, Germany;

and polychloroprene (poly(2-chloro-1,3-butadiene)) sold under the trade name NEOPRENE, by DuPont, Wilmington, Del.

The reinforcement polymers generally are present in the curable hot melt compositions in amounts of about 10% to about 90% by weight of the composition, more specifically about 25% to about 75% by weight of the composition, and even more specifically about 40% to about 60% by weight of the composition.

The reinforcement polymers may be combined with any of the silicone urea based reactive polymers of the formulas provided below to provide a curable hot melt composition. In general, the reactive polymers described below are present in the curable hot melt compositions in amounts of about 10% to about 90% by weight of the composition, more specifically about 25% to about 75% by weight of the composition, and even more specifically about 40% to about 60% by weight of the composition. Methods of making the reactive polymers of Formulas A, B and C and the curable hot melt compositions, as well as methods of using the hot melt compositions, also are described below.

A) Compositions of Formula A

In some embodiments, the present inventive compositions are directed to silicone urea hot melt compositions that include a reactive polymer containing moisture curable alkoxysilyl groups and a reinforcement polymer, as described above. Reactive polymers for use in the hot melt compositions of the present invention are indicated by Formula A(II):

—$CH_2CH_2$—O—$CH_3$. In a desirable aspect, $R^1$ is $C_1$ to $C_6$ alkyl. More desirably, $R^1$ is H, ethyl, or propyl.

$R^2$ in each occurrence may be the same or different, and is a $C_1$ to $C_{10}$ hydrocarbon radical. Substituent $R^2$, in combination with the oxygen to which it is attached, forms a hydrolyzable group, which provides the compositions of the present invention with their ability to undergo room temperature vulcanization (RTV). RTV cure typically occurs through exposure of the compositions of the present invention to moisture. The presence of hydrolyzable moisture curing groups, such as alkoxy groups, on the silicone backbone permits the compositions of the invention to undergo moisture cure. Suitable hydrolyzable groups include alkoxy groups such as methoxy, ethoxy, propoxy, and butoxy; aryl groups such as phenoxy; acyloxy groups such as acetoxy; aryloxy groups such as phenoxy; and alkoxyalkyl groups such as $CH_3OCH_2CH_2$—. Larger groups such as propoxy and butoxy are slower to react than smaller groups such as methoxy and ethoxy. Accordingly, the rate at which the compositions of the invention undergo moisture cure can be influenced by choosing appropriately sized groups for substituent $R^2$. Desirably, $R^2$ is $C_1$ to $C_4$ alkyl. More desirably, $R^2$ is methyl or ethyl.

$R^3$ in each occurrence may be the same or different and is a $C_1$ to $C_{10}$ hydrocarbon radical. $R^3$ is desirably $C_1$ to $C_4$ alkyl. More particularly, $R^3$ is desirably methyl.

$R^4$ in each occurrence may be the same or different and is a $C_1$ to $C_{10}$ hydrocarbon radical. $R^4$ is desirably $C_1$ to $C_4$ alkyl.

Formula A (II)

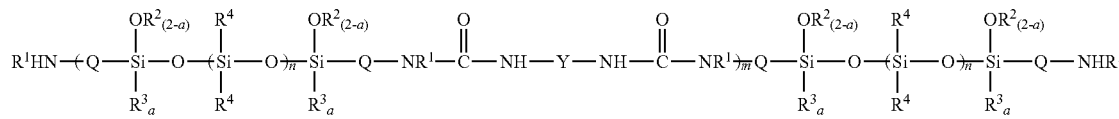

Q in each occurrence may be the same or different and is a $C_1$ to $C_{10}$ hydrocarbon radical. Advantageously, Q is $C_1$ to $C_{10}$ alkylene. In a particularly advantageous aspect, Q is methylene, propylene, or isobutylene.

Y in each occurrence may be the same or different and is a $C_1$ to $C_{20}$ hydrocarbon diradical. The hard segments of the polymer backbone are obtained from the diisocyanate starting material useful in preparation of the compositions of the invention. Y represents the hydrocarbon portion of the diisocyanate starting material. Illustrative of these diisocyanates are phenyl diisocyanate, toluene diisocyanate, 4,4'-diphenyl diisocyanate, 4,4'-diphenylene methane diisocyanate, dianisidine diisocyanate, 1,5-naphtalene diisocyanate, 4,4'-diphenyl ether diisocyanate, p-phenylene diisocyanate, 4,4,'-dicyclo-hexylmethane diisocyanate, 1,3-bis-(isocyanatomethyl) cyclohexane, cyclohexylene diisocyanate, tetrachlorophenylene diisocyanate, 2,6-diethyl-p-phenylenediisocyanate, 3,5-diethyl-4,4'-diisocyanatodiphenyl-methane, isophorone diisocyanate, hexamethylene diisocyanate, and 1,3-bis(cyanatomethyl)cyclohexane. Combinations of diisocyanates may also be used. In an advantageous aspect, the diisocyanate may be one of isophorone diisocyanate, hexamethylene diisocyanate, or 1,3-bis(cyanatomethyl)cyclohexane.

$R^1$ in each occurrence may be the same or different and is a member selected from H and $C_1$ to $C_{10}$ alkyl. In one aspect of the present invention, $R^1$ of compositions of Formula A(II) may be chosen from $C_1$-$C_{10}$ alkyl. These groups may also be substituted if desired. For example, one useful substitution is In most commercial applications, $R^4$ will desirably be methyl, due to the wide availability of the polydimethylsiloxane starting material which is advantageously used in the synthesis of the reactive polymers of the invention. In another desirable aspect, $R^4$ may also be phenyl.

Variable "a" in each occurrence may be the same or different and is 0 or 1. "m" in each occurrence may be the same or different, and is 1 to about 100.

In an advantageous aspect of reactive polymers of Formula A(II), $R^1$ is $C_1$ to $C_6$ alkyl, $R^2$ is $C_1$ to $C_4$ alkyl, $R^3$ is $C_1$ to $C_4$ alkyl, and $R^4$ is $C_1$ to $C_4$ alkyl.

In another advantageous aspect of reactive polymers of Formula A(II), Q is a $C_1$ to $C_{10}$ alkyl diradical and Y is a $C_1$ to $C_{10}$ alkyl diradical.

Additionally, substitution of the alkyl group of $R^1$-$R^4$ is also contemplated.

In one particularly useful aspect of the invention, reactive polymers of Formula A(II) have the following specific substitutions: $R^1$ is ethyl; $R^2$ is methyl; $R^3$ is methyl; $R^4$ is methyl; Q is isobutylene; and Y is the hydrocarbyl portion of a diisocyanate selected from isophorone diisocyanate, hexamethylene diisocyanate, and 1,3-bis(cyanatomethyl)cyclohexane.

Another aspect of the present invention relates to a curable hot melt composition, which includes a reinforcement polymer and the reaction product of a diisocyanate and a siloxane of Formula A(I):

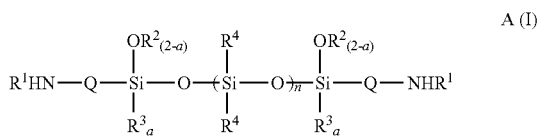

where $R^1$, $R^2$, $R^3$, $R^4$, a, Q, and n are as discussed above for reactive polymers of Formula A(II).

The diisocyanates useful in the present invention are those of the formula:

OCN—Y—NCO where Y is as discussed above for reactive polymers of Formula A(II).

Illustrative of these diisocyanates are phenyl diisocyanate, toluene diisocyanate, 4,4'-diphenyl diisocyanate, 4,4'-diphenylene methane diisocyanate, dianisidine diisocyanate, 1,5-naphtalene diisocyanate, 4,4'-diphenyl ether diisocyanate, p-phenylene diisocyanate, 4,4'-dicyclo-hexylmethane diisocyanate, 1,3-bis-(isocyanatomethyl) cyclohexane, cyclohexylene diisocyanate, tetrachlorophenylene diisocyanate, 2,6-diethyl-p-phenylenediisocyanate, 3,5-diethyl-4,4'-diisocyanatodiphenyl-methane, isophorone diisocyanate, hexamethylene diisocyanate, and 1,3-bis(cyanatomethyl)cyclohexane.

It is advantageous for the diisocyanate to be one of isophorone diisocyanate, hexamethylene diisocyanate, or 1,3-bis(cyanatomethyl)cyclohexane. Combinations of diisocyanates may also be used.

The reactive polymers included in the curable hot melt compositions of the present invention include both hard and soft segments along the polymer backbone. The silicone segments are considered soft, flexible segments and the segments attributable to the diisocyanate starting material are considered the relatively hard segments.

Figure 3:
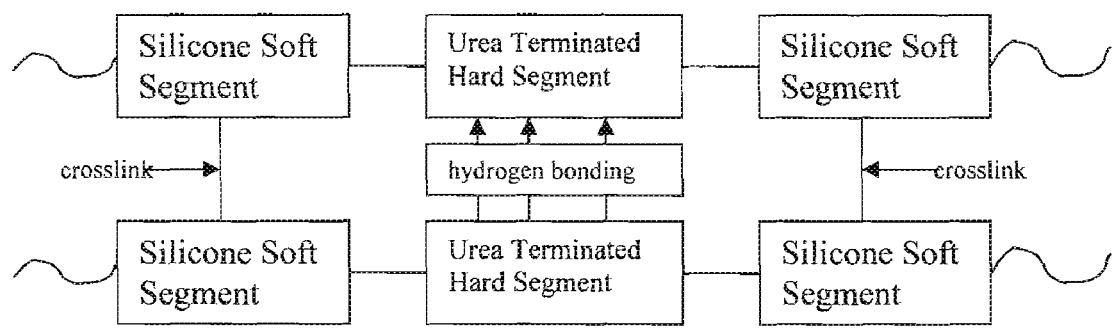
FIG. 3 is a schematic representation of the hydrogen bonding which is possible due to the relative positioning of the crosslinking groups and the hard segments of the reactive polymers of Formulas A.

The compositions of the present invention are structurally designed, i.e., the crosslinking, sites are positioned on the polymer, such that upon cure the hard segments are forced in close proximity to each other. This positioning results in increased physical properties at higher temperatures due to the resultant hydrogen bonding between adjacent hard segments. The cured compositions of the present invention thus achieve not only physical properties attributable to crosslinking, but increased physical properties due to the additional molecular attraction as a result of segments capable of hydrogen bonding being forced into close proximity with each other as crosslinking occurs. FIG. 3 shows in schematic form the relative positions of curing groups to hard segments.

As a result of the structural design of the hard segments being at positions intermediate to the crosslinking groups, the cured polymers exhibit improved physical properties at temperatures of greater than 150° C. Whereas conventional non-reactive hot melt adhesives usually flow at temperatures of about 100° C., cured samples of the present invention have sustained their solidity and physical strength after more than a month at 150° C.

Although primary amines may be used in making the amino-terminated silicone reactant of the present invention, they are less preferable than secondary amines due to the former's higher tendency for undesirable side-reactions, e.g. biuret formation.

In preparation of the compositions of the present invention, aminoalkylenealkoxy terminated polydialkylsiloxanes are reacted with a diisocyanate. The aminoalkylenealkoxy terminated polydialkylsiloxanes may be formed as described in U.S. Pat. No. 6,750,309 B1, assigned to Henkel Corporation, which is incorporated herein in its entirety. As seen from this reference, these reactants can be formed by reacting alkylaminoalkylene trialkoxysilanes with hydroxy-terminated polydimethylsiloxane ("PDMS"). The product of this reaction results in the aminoalkylenealkoxy-terminated polydialkylsiloxanes. Column 12, Example XI of the '309 patent describes these compounds in more detail.

Particularly useful examples of aminoalkylenealkoxy terminated polydialkylsiloxanes include ethylaminoisobutyltrimethoxysilane and aminopropyltrimethoxysilane.

The polyalkylsiloxane is desirably chosen from those easily found commercially, such as silanol terminated polydimethylsiloxanes. The molecular weights of these silicon fluids may vary and may be chosen to tailor the final product characteristics. The number of repeating units, n, can be varied to achieve specific molecular weight, viscosities, and other chemical or physical properties. Generally, n is an integer such that the viscosity is from about 25 cps to about 2,500,000 cps at 25° C., such as when n is from 1 to about 1,200 and desirably from 10 to about 1,000. Examples of useful molecular weights of the polyalkylsiloxanes include molecular weights of 500 to about 50,000 atomic mass units. Advantageously, the average molecular weight of the siloxane of structure A(I) is about 1,000 atomic mass units to about 30,000 atomic mass units.

Compositions of the present invention may include amine compounds separate and apart from the amino-terminated ends of the siloxane reactant. For example, diamines such as ethylenediamine may be employed.

A further aspect of the present invention relates to a curable hot melt composition including the reaction product of a diisocyanate and an aminoalkylenealkoxy terminated polydialkylsiloxane, where the amino portion of the aminoalkylenealkoxy terminated polydialkylsiloxane is desirably a secondary amine, and a reinforcement polymer. Advantageously, the aminoalkylenealkoxy terminated polydialkylsiloxane is selected from ethylaminoisobutyltrimethoxysilane, ethyaminoisobutyltriethoxysilane, butylaminopropyltrimethoxysilane, butylaminopropyltriethoxysilane, aminopropyltrimethoxysilane, aminopropyltriethoxysilane and combinations thereof. More advantageously, the polydialkylsiloxane portion of the polymer is polydimethylsiloxane.

Another aspect of the present invention provides a process for making a moisture curable composition involving:

a. providing a mixture of:
   i. a first reactant including a diisocyanate; and
   ii. a second reactant including an aminoalkylenealkoxy terminated polyalkylsiloxane;
b. reacting the first and second reactants to form a moisture curable polymer; and
c. mixing the moisture curable polymer with a reinforcement polymer to form the moisture curable composition.

The diisocyanate and the aminoalkylenealkoxy terminated polyalkylsiloxane are as described above.

Another aspect of the present invention provides a method of using a curable hot melt adhesive including the steps of:

a. providing a sealed container of an adhesive composition including:
   i. a reactive polymer having the Formula A(II):

Formula A (II)

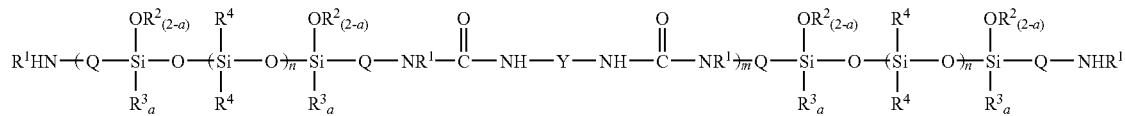

where $R^1$, $R^2$, $R^3$, $R^4$, Q, Y, n, m, and a are as discussed above for compositions of Formula A; and
ii. a reinforcement polymer;
b. heating the adhesive to a temperature sufficient to permit dispensing of the adhesive; and
c. dispensing the adhesive onto a substrate and permitting the adhesive to cure.

The compositions of the present invention are designed to be packaged into containers, dispensers or cartridges which are substantially resistant to moisture and air in order to prevent undesirable premature crosslinking. The cartridges are made from materials which can be subjected to temperatures of up to 150° C. or more without loss of their ability to dispense in order to melt the reactive hot melt composition contained therein. For example, aluminum cartridges may be particularly useful.

Yet another aspect of the present invention provides a hot melt adhesive product which includes:
a. a moisture resistant container capable of housing and/or dispensing a moisture curable hot melt adhesive, and
b. a moisture curable hot melt adhesive located with the container.

Advantageously, the moisture curable hot melt adhesive includes a reactive polymer corresponding to structure A(II):

metal compounds which contain such metals as titanium, tin, or zirconium. Illustrative examples of titanium compounds include tetraisopropoxy titanate and tetrabutoxy titanate. Illustrative examples of the tin compounds include dibutyltin dilaurate, dibutyltin diacetate, dioctyltindicarboxylate, dimethyltindicarboxylate, and dibutyltin dioctoate. Illustrative examples of the zirconium compounds include zirconium octanoate. The moisture-cure catalysts may be employed in an amount sufficient to promote moisture-cure, which generally is from about 0.05% to about 5.00% by weight, and advantageously from about 0.5% to about 2.5% by weight. Tin octoate, dibutyltin dilaurate, tetraisopropoxy titanate and tetrabutoxy titanate are particularly desirable. U.S. Pat. No. 4,111,890 lists numerous others that are useful.

A variety of additional useful components may be added to the present inventive compositions. For example, reactive and non-reactive diluents may be added. Such diluents include, without limitation, isobornyl (meth)acrylate, dimethylacrylamide, (meth)acrylic acid and vinyl trimethoxysilane. Other useful additives include plasticizers, fillers, viscosity modifiers, flow modifiers, pigments, stabilizers, inhibitors, adjuvants, catalysts, accelerators, thixotropic agents and combinations thereof. These additives should be present in amounts suitable to effectuate their intended purpose.

Formula A (II)

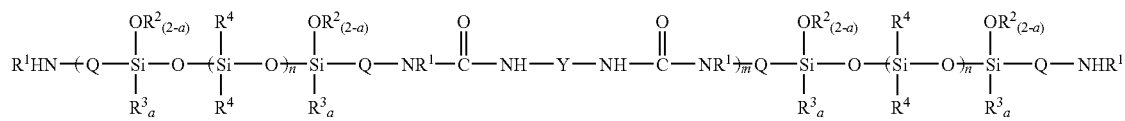

where $R^1$, $R^2$, $R^3$, $R^4$, Q, Y, m, n, and a are as discussed above for compositions of Formula A, and
a reinforcement polymer.

The present invention is also directed to compositions that are the reaction product of water and curable hot melt compositions, which include a reactive polymer of Formula A(II) and a reinforcement polymer. Compositions including reactive polymers of Formula A(II) do not require added moisture curing catalysts, due to the self-catalyzing effect of the amino groups. Optionally, however, the inventive compositions may include moisture curing catalysts to further enhance or control the cure speed. Suitable moisture-cure catalysts include B) Compositions of Formula B In some embodiments, the present inventive compositions are directed to silicone-containing compositions that have enhanced rheology control. The compositions include a reactive silicone polymer and a reinforcement polymer, as described above.

Compositions of Formula B(I)

Reactive polymers for use in such embodiments of the present invention are indicated by Formula B(I):

Formula B (I)

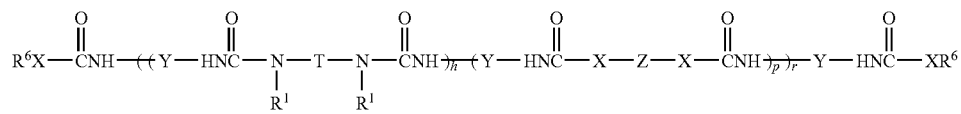

The reactive polymers of Formula B(I) of the present invention include both hard and soft segments along the polymer backbone. T provides the soft-segments, of the reactive polymers of Formula B(I). T in each occurrence may be the same or different and is:

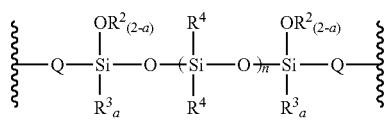

The silicone segments provided by T are considered to be pliant and flexible segments.

Y in each occurrence may be the same or different and is a $C_1$ to $C_{20}$ hydrocarbon diradical. The hard segments of the polymer backbone are obtained from the diisocyanate starting material useful in preparation of the compositions of the invention. Y represents the hydrocarbon portion of the diisocyanate starting material. Illustrative of these diisocyanates are phenyl diisocyanate, toluene diisocyanate, 4,4'-diphenyl diisocyanate, 4,4'-diphenylene methane diisocyanate, dianisidine diisocyanate, 1,5-naphtalene diisocyanate, 4,4'-diphenyl ether diisocyanate, p-phenylene diisocyanate, 4,4'-dicyclo-hexylmethane diisocyanate, 1,3-bis-(isocyanatomethyl)cyclohexane, cyclohexylene diisocyanate, tetrachlorophenylene diisocyanate, 2,6-diethyl-p-phenylenediisocyanate, 3,5-diethyl-4,4'-diisocyanatodiphenyl-methane, isophorone diisocyanate, hexamethylene diisocyanate, and 1,3-bis(cyanatomethyl)cyclohexane. Combinations of diisocyanates may also be used. In an advantageous aspect, the diisocyanate may be one of isophorone diisocyanate, hexamethylene diisocyanate, or 1,3-bis(cyanatomethyi)cyclohexane.

Q in each occurrence may be the same or different and is a $C_1$ to $C_{10}$ hydrocarbon radical. Advantageously, Q is $C_1$ to $C_{10}$ alkylene. In a particularly advantageous aspect, Q is methylene, propylene, or isobutylene.

X in each occurrence may be the same or different and is a member selected from O, S, and $NR^5$,
where $R^5$ in each occurrence may be the same or different and is a member selected from H, $C_1$ to $C_{10}$ hydrocarbon radical, and $(R^7O)_b SiR^8_{(3-b)}$—Q—,
where
$R^7$ in each occurrence may be the same or different and is $C_1$ to $C_{10}$ alkyl;
$R^8$ in each occurrence may be the same or different and is $C_1$ to $C_{10}$ Oalkyl;
b in each occurrence may be the same or different and is 0, 1, or 2.

X is included in both the chain-extenders and chain-terminators of the present invention. X represents the heteroatom which reacts with the isocyanate groups which may be used in preparation of the compositions of the invention. Advantageously, X is O, NH, $N(C_1$ to $C_5$ alkyl) or $N(C_1$ to $C_8$ aryl).

Z in each occurrence may be the same or different and is a $C_1$ to $C_{20}$ hydrocarbon diradical. Z represents the hydrocarbon portion of the chain-extenders which may be used in preparation of reactive polymers of Formula B. Advantageously, Z is $C_1$ to $C_5$ alkylene, such as ethylene and butylene.

$R^1$ in each occurrence may be the same or different and is a member selected from H and $C_1$ to $C_{10}$ alkyl. In a desirable aspect, $R^1$ is $C_1$ to $C_6$ alkyl. More desirably, $R^1$ is H, ethyl, or propyl.

$R^2$ in each occurrence may be the same or different, and is a $C_1$ to $C_{10}$ hydrocarbon radical. Substituent $R^2$, in combination with the oxygen to which it is attached, forms a hydrolyzable group, which provides the compositions of the present invention with their ability to undergo room temperature vulcanization (RTV). RTV cure typically occurs through exposure of the compositions of the present invention to moisture. The presence of hydrolyzable moisture curing groups, such as alkoxy groups, on the silicone backbone permits the compositions of the invention to undergo moisture cure. Suitable hydrolyzable groups include alkoxy groups such as methoxy, ethoxy, propoxy, and butoxy; aryl groups such as phenoxy; acyloxy groups such as acetoxy; aryloxy groups such as phenoxy; and alkoxyalkyl groups such as $CH_3OCH_2CH_2$—. Larger groups such as propoxy and butoxy are slower to react than smaller groups such as methoxy and ethoxy. Accordingly, the rate at which the compositions of the invention undergo moisture cure can be influenced by choosing appropriately sized groups for substituent $R^2$. Desirably, $R^2$ is $C_1$ to $C_4$ alkyl. More desirably, $R^2$ is methyl or ethyl.

$R^3$ in each occurrence may be the same or different and is a $C_1$ to $C_{10}$ hydrocarbon radical. $R^3$ is desirably $C_1$ to $C_4$ alkyl. More particularly, $R^3$ is desirably methyl.

$R^4$ in each occurrence may be the same or different and is a $C_1$ to $C_{10}$ hydrocarbon radical. $R^4$ is desirably $C_1$ to $C_4$ alkyl. In most commercial applications, $R^4$ will desirably be methyl, due to the wide availability of the polydimethylsiloxane starting material which is advantageously used in the synthesis of the reactive polymers of the invention. In another desirable aspect, $R^4$ may also be phenyl.

$R^6$ in each occurrence may be the same or different and is a member selected from H and a $C_1$ to $C_{10}$ hydrocarbon radical. Desirably, $R^6$ is $C_1$ to $C_6$ alkyl. More desirably, $R^6$ is H.

In an advantageous aspect of reactive polymers of Formula B(I), $R^1$ is $C_1$ to $C_6$ alkyl, $R^2$ is $C_1$ to $C_4$ alkyl, $R^3$ is $C_1$ to $C_4$ alkyl, $R^4$ is $C_1$ to $C_4$ alkyl, and $R^6$ is $C_1$ to $C_6$ alkyl.

In another advantageous aspect of reactive polymers of Formula B(I), Q is a $C_1$ to $C_{10}$ alkyl diradical, Y is a $C_1$ to $C_{10}$ alkyl diradical, Z is a $C_1$ to $C_{10}$ alkyl diradical, and X is a member selected from NH, $N(C_1$ to $C_5$ alkyl) and $N(C_1$ to $C_8$ aryl).

Also representative of the reactive polymers employed in the curable compositions of the invention are those of Formulas B(II), B(III), and B(IV):

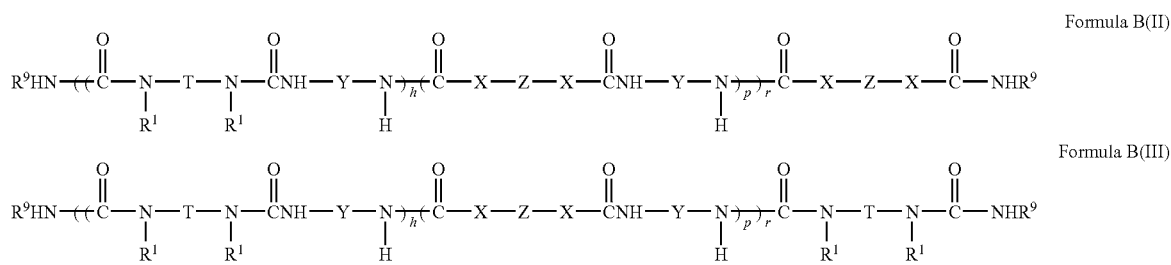

-continued

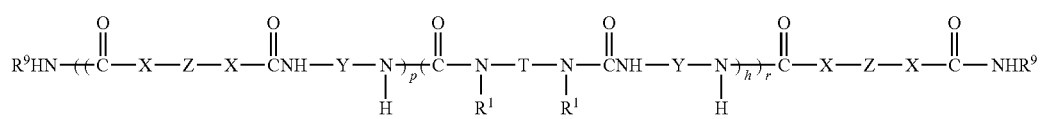

Formula B(IV)

where $R^1$, $R^2$, $R^3$, $R^4$, Q, X, Y, Z, a, h, p, r, and n are as discussed above for reactive polymers of Formula B(I), and $R^9$ in each occurrence may be the same or different and is a $C_1$ to $C_{10}$ hydrocarbon radical.

The present invention is also directed to compositions that are the reaction product of water and curable hot melt compositions, which include a reactive polymer corresponding to at least one of Formulas B(I), B(II), B(III), and B(IV) and a reinforcement polymer. The inventive compositions further may include moisture curing catalysts to enhance or control the cure speed. Suitable moisture-cure catalysts include metal compounds which contain such metals as titanium, tin, or zirconium. illustrative examples of titanium compounds include tetraisopropoxy titanate and tetrabutoxy titanate. Illustrative examples of the tin compounds include dibutyltin dilaurate, dibutyltin diacetate, dioctyltindicarboxylate, dimethyltindicarboxylate, and dibutyltin dioctoate. Illustrative examples of the zirconium compounds include zirconium octanoate. The moisture-cure catalysts may be employed in an amount sufficient to promote moisture-cure, which generally is from about 0.05% to about 5.00% by weight, and advantageously from about 0.5% to about 2.5% by weight.

The compositions of the present invention may be cured at ambient temperatures or at elevated temperatures.

A variety of additional useful components may be added to the present inventive compositions, so long as they do not interfere with the moisture curing mechanism. For example, reactive and non-reactive diluents may be added. Such diluents include, without limitation, isobornyl methacrylate, dimethacrylamide, methacrylic acid and vinyl trimethoxysilane. Other useful additives include plasticizers, fillers, viscosity modifiers, flow modifiers, pigments, stabilizers, inhibitors, adjuvants, catalysts, accelerators, thixotropic agents, and combinations thereof. These additives should be present in amounts suitable to effectuate their intended purpose.

The compositions of the present invention are designed to be packaged into containers, dispensers, or cartridges which are substantially resistant to moisture and air in order to prevent undesirable premature crosslinking. The cartridges of the invention are made from materials which can be subjected to temperatures of up to 150° C. or more without loss of their ability to dispense in order to melt the reactive hot melt composition contained therein. For example, aluminum cartridges are particularly useful.

The curable compositions including reactive polymers of Formula B and reinforcement polymers can be used in a variety of applications, including those where high temperature resistance and high physical properties are needed. Illustrative examples of such uses include automotive headlamp bonding, and as sealants for stove tops. In one aspect, a method of using a curable composition of the invention includes the steps of:

a) providing a composition including a reactive polymer of Formula B(I) and a reinforcement polymer;
b) applying the composition onto a substrate; and
c) permitting the composition to cure.

In another aspect, the present invention is directed to an article of manufacture which includes two substrates bonded together by a composition including a reactive polymer of any of Formulas B(I), B(II), B(III), or B(IV) and a reinforcement polymer.

Preparation of the Compositions of Formula B

The following reaction scheme depicts the synthesis of reactive polymers of Formula B(I):

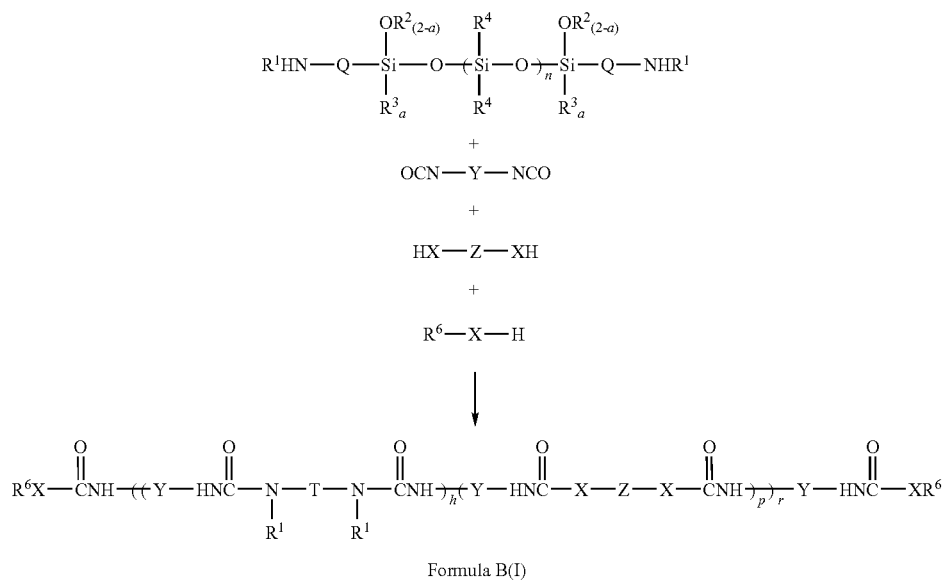

Formula B(I)

As can be seen in the reaction scheme above, reactive polymers of Formula B(I) may be prepared by mixing:

a) a siloxane of the formula:

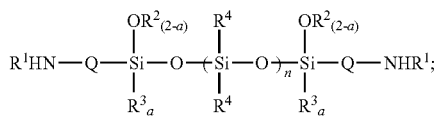

b) a diisocyanate having the formula:

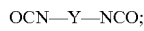

c) a chain-extender having the formula:

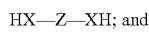

d) a chain-terminator having the formula;

where $R^1$, $R^2$, $R^3$, $R^4$, $R^6$, Q, X, Y, Z, a, and n are as discussed above for reactive polymers of Formula A. The reaction product of this method may be mixed with a reinforcement polymer to provide curable hot melt compositions of the present invention.

As noted above, the siloxane used in preparation of the reactive polymers of Formula A provides the soft segment portion of the compositions. The siloxane may be formed as described in U.S. Pat. No. 6,750,309 B1, assigned to Henkel Corporation, which is incorporated herein in its entirety. As seen from this reference, trialkoxysilanes can be reacted with, for example, polydimethylsiloxane, producing a suitable siloxane. Illustrative of the siloxanes used in the present invention are ethylaminoisobutyltrimethoxysilane, ethylaminoisobutyltrimethoxysilane, butylaminopropyltrimethoxysilane, butylaminopropyltrimethoxysilane, aminopropyltrimethoxysilane, aminopropyltrimethoxysilane, and combinations thereof. Particularly useful examples of such siloxanes include ethylaminopropyltrimethoxysilane and cyclohexylaminomethyltrimethoxysilane.

The siloxane is desirably chosen from those easily found commercially available, such as polydimethylsiloxanes. The number of repeating units, n, can be varied to achieve specific molecular weights, viscosities, and other chemical or physical properties. Generally n is an integer such that the viscosity is from about 25 cps to about 2,500,000 cps at 25° C., such as when n is from 1 to about 1,200 and desirably from 10 to about 1,000. The molecular weights of these siloxanes may vary and may be chosen to tailor the final product characteristics. Examples of useful molecular weights of the polyalkylsiloxanes include molecular weights of 500 to about 50,000 atomic mass units. Advantageously, the average molecular weight of the siloxane is about 1,000 atomic mass units to about 30,000 atomic mass units.

The chain-extenders of the invention react with the isocyanate and increases the hard segment content, thus increasing the viscosity and the melting range of the inventive compositions. The chain-extenders contain a diisocyanate as discussed above for compositions of Formula B.

The chain-terminators of the invention serve to limit the growth of the copolymer chain, which accordingly lowers the viscosity and melting range of the polymers. The chain-terminators useful for preparation of reactive polymers of Formula B(I) contain a single group capable of reaction with an isocyanate group, such as an amino group, a hydroxy group, or a thiol group.

The following reaction scheme depicts the synthesis of reactive polymers of Formulas B(II), B(III), and B(IV):

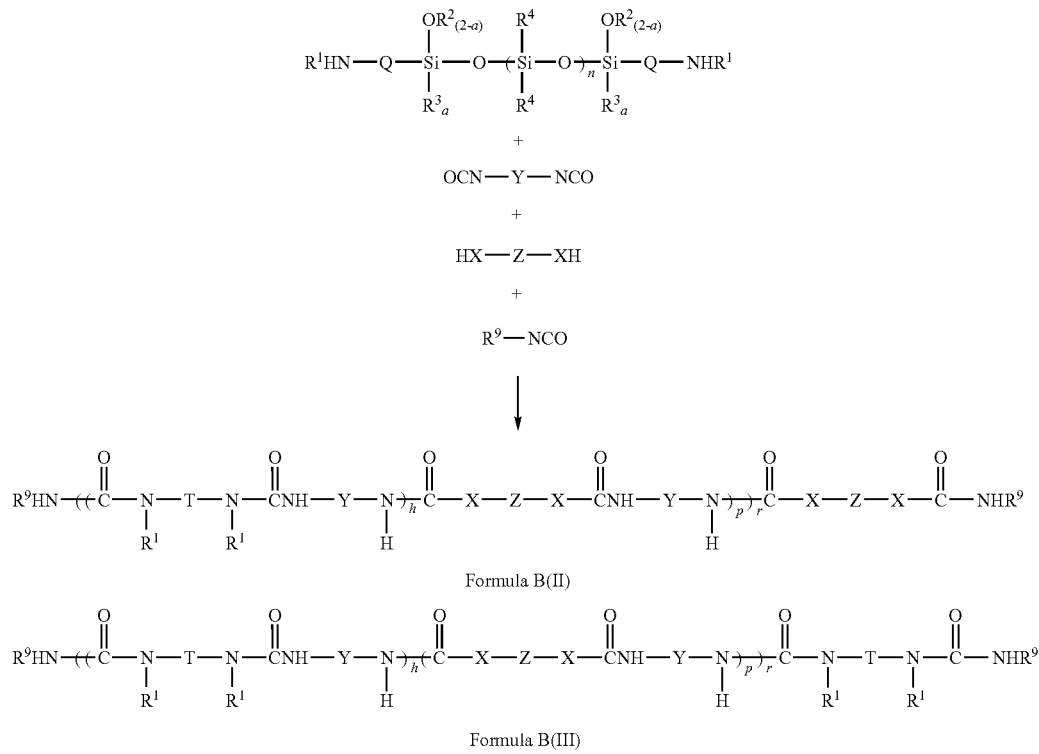

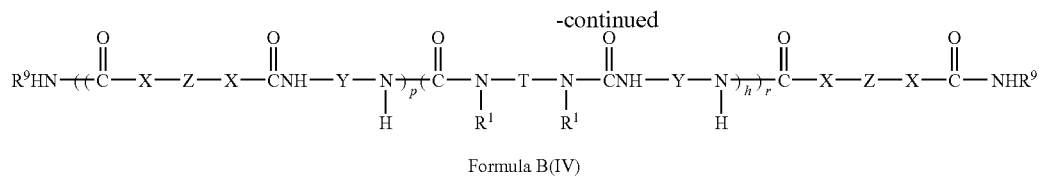

Formula B(IV)

As can be seen in the above reaction scheme, reactive polymers of Formulas B(II), B(III), and B(IV) may be prepared by mixing:

a) a siloxane of the formula:

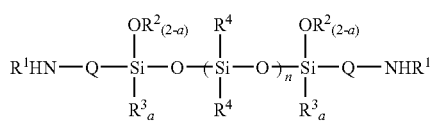

b) a diisocyanate having the formula:

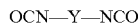

OCN—Y—NCO c) a chain-extender having the formula:

HX—Z—XH; and d) a chain-terminator having the formula;

$R^9$—NCO where the siloxane, the diisocyanate, the chain-extender, and the substituents $R^1$, $R^2$, $R^3$, $R^4$, $R^9$, Q, X, Y, Z, a, and n are as discussed above for reactive polymers of Formula B. The reaction product of this method may be mixed with a reinforcement polymer to provide curable hot melt compositions of the present invention.

Whereas the method for preparing reactive polymers of Formula B(I) uses chain-terminator of the formula, $R^6$-X-H, the method for preparing reactive polymers of Formulas B(II), B(III), and B(IV) uses instead an isocyanate of the formula $R^9$-NCO, as shown in FIGS. 4 and 5. When such an isocyanate is used, three products may be formed: 1) those of Formula B(II) in which the two ends are different from one another, one being obtained from reaction of the isocyanate with the amine of the siloxane, and one being obtained from reaction of the isocyanate and the chain extender; 2) those of Formula B(III) in which both ends are the reaction product of the isocyanate and the amine group of the siloxane; and 3) those of Formula B(IV) in which both ends are reaction products of the isocyanate with one end of the chain extender. The above reaction in which the $R^9$-NCO isocyanate is used will generally result in a mixture of Formulas B(II), B(III)$_3$ and B(IV). By adjusting reaction conditions, reactive polymers of Formulas B(II), B(III), and B(IV) may be obtained in varying amounts.

C) Compositions of Formula C

In some aspects, the present invention is directed to silicone-containing compositions which are capable of both radiation and moisture-cure. The compositions include a reactive silicone polymer of Formula C and a reinforcement polymer, as described above. Reactive polymers of Formula C provide a hot melt composition which can be dispensed at high temperature. After dispensing, the composition rapidly gains green strength by cooling or more preferably by radiation curing. The dispensed material can further undergo a secondary moisture curing to form a crosslinked network which can be used for high temperature applications.

Typical reactive polymers for use in such embodiments of the present invention are indicated by Formula C(I):

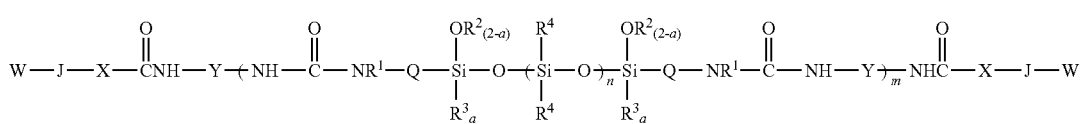

Formula C(I)

J in each occurrence may be the same or different and is a $C_1$ to $C_{10}$ hydrocarbon diradical.

Q in each occurrence may be the same or different and is a $C_1$ to $C_{10}$ hydrocarbon radical. Advantageously, Q is $C_1$ to $C_{10}$ alkylene. In a particularly advantageous aspect, Q is methylene, propylene, or isobutylene.

The reactive polymers of Formula C include both hard and soft segments along the polymer backbone. The soft-segments may be provided by the portion of the formula corresponding to the segment below:

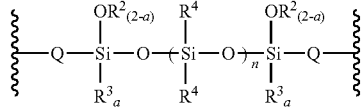

These segments are considered to be pliant and flexible segments.

W in each occurrence may be the same or different and is $C_2$ to $C_{10}$ hydrocarbon radical capable of free-radical polymerization known to those skilled in the art. Desirably, W contains at least one of: a double bond, a carbonyl group, or an epoxide group. Examples of functional groups which are encompassed by substituent W include, but are not limited to: epoxy, acryloxy, and alkylacryloxy. Advantageously, substituent W is a methacryloxy group.

X in each occurrence may be the same or different and is a member selected from O, S, and $NR^{10}$, where $R^{10}$ in each occurrence may be the same or different and is a member selected from H and a $C_1$ to $C_{10}$ hydrocarbon radical.

Y in each occurrence may be the same or different and is a $C_1$ to $C_{20}$ hydrocarbon diradical. The hard segments of the polymer backbone are obtained from the diisocyanate starting material useful in preparation of the compositions of the invention. Y represents the hydrocarbon portion of the diisocyanate starting material. Illustrative of these diisocyanates are phenyl diisocyanate, toluene diisocyanate, 4,4'-diphenyl diisocyanate, 4,4'-diphenylene methane diisocyanate, dianisidine diisocyanate, 1,5-naphtalene diisocyanate, 4,4'-diphenyl ether diisocyanate, p-phenylene diisocyanate, 4,4'-dicyclo-hexylmethane diisocyanate, 1,3-bis-(isocyanatomethyl)cyclohexane, cyclohexylene diisocyanate, tetrachlorophenylene diisocyanate, 2,6-diethyl-p-phenylenediisocyanate, 3,5-diethyl-4,4'-diisocyanatodiphenyl-methane, isophorone diisocyanate, hexamethylene diisocyanate, and 1,3-bis(cyanatomethyl)cyclohexane. Combinations of diisocyanates may also be used. In an advantageous aspect, the diisocyanate may be one of isophorone diisocyanate, hexamethylene diisocyanate, or 1,3-bis(cyanatomethyl)cyclohexane.

$R^1$ in each occurrence may be the same or different and is a member selected from H and $C_1$ to $C_{10}$ alkyl. In a desirable aspect, $R^1$ is $C_1$ to $C_6$ alkyl. More desirably, $R^1$ is H, ethyl, or propyl.

$R^2$ in each occurrence may be the same or different, and is a $C_1$ to $C_{10}$ hydrocarbon radical. Substituent $R^2$, in combination with the oxygen to which it is attached, forms a hydrolyzable group, which provides the compositions of the present invention with their ability to undergo room temperature vulcanization (RTV). RTV cure typically occurs through exposure of the compositions of the present invention to moisture. The presence of hydrolyzable moisture curing groups, such as alkoxy groups, on the silicone backbone permits the compositions of the invention to undergo moisture cure. Suitable hydrolyzable groups include alkoxy groups such as methoxy, ethoxy, propoxy, and butoxy; aryl groups such as phenoxy; acyloxy groups such as acetoxy, and alkoxyalkyl groups such as $CH_3OCH_2CH_2$—. Larger groups such as propoxy and butoxy are slower to react than smaller groups such as methoxy and ethoxy. Accordingly, the rate at which the compositions of the present invention undergo moisture cure can be influenced by choosing appropriately sized groups for substituent $R^2$. Desirably, $R^2$ is $C_1$ to $C_4$ alkyl. More desirably, $R^2$ is methyl or ethyl.

$R^3$ in each occurrence may be the same or different and is a $C_1$ to $C_{10}$ hydrocarbon radical. $R^3$ is desirably $C_1$ to $C_4$ alkyl. More particularly, $R^3$ is desirably methyl.

$R^4$ in each occurrence may be the same or different and is a $C_1$ to $C_{10}$ hydrocarbon radical. $R^4$ is desirably $C_1$ to $C_4$ alkyl. In most commercial applications, $R^4$ will desirably be methyl, due to the wide availability of the polydimethylsiloxane starting material which is advantageously used in the synthesis of the compositions of the invention.

In an advantageous aspect, reactive polymers of Formula C(I) are of Formula C(II):

Formula C(II)

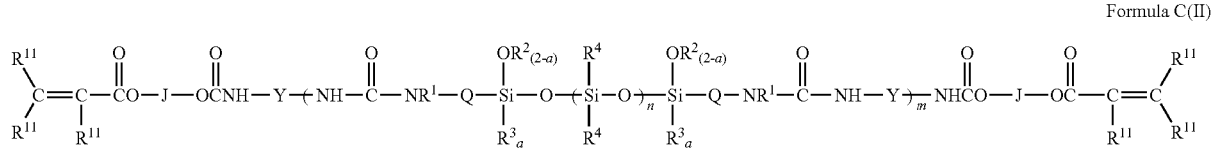

where $R^1$ is $C_1$ to $C_6$ alkyl, $R^2$ is $C_1$ to $C_4$ alkyl, $R^3$ is $C_1$ to $C_4$ alkyl, $R^4$ is $C_1$ to $C_4$ alkyl, J in each occurrence may be the same or different and is a $C_1$ to $C_{10}$ hydrocarbon diradical, and $R^{11}$ in each occurrence may be the same or different and is a member selected from H and $C_1$ to $C_4$ alkyl.

Also representative of the reactive polymers of Formula C are those of Formula C(III):

Formula C(III)

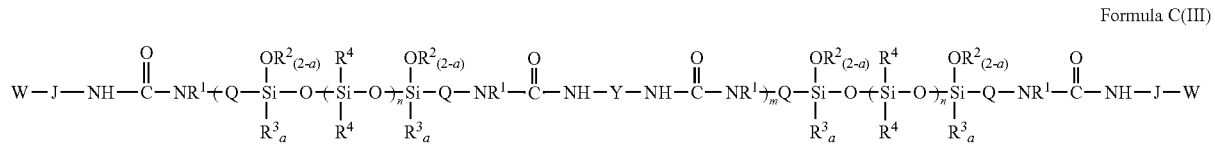

where J, $R^1$, $R^2$, $R^3$, $R^4$, Q, Y, W, a, n, and m are as discussed above for reactive polymers of Formula C.

In an advantageous aspect of compositions of Formula C(II), $R^1$ is $C_1$ to $C_6$ alkyl, $R^2$ is $C_1$ to $C_4$ alkyl, $R^3$ is $C_1$ to $C_4$ alkyl, $R^4$ is $C_1$ to $C_4$ alkyl, and Y is

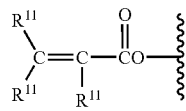

where $R^{11}$ in each occurrence may be the same or different and is a member selected from H and $C_1$ to $C_4$ alkyl.

The present invention is also directed to compositions that are the reaction product of water and curable compositions, which include at least one of Formulas C(I) and C(III) and a reinforcement polymer. The inventive compositions may optionally include moisture curing catalysts to further enhance or control the cure speed. Suitable moisture-cure catalysts include metal compounds which contain such metals as titanium, tin, or zirconium. Illustrative examples of titanium compounds include tetraisopropoxy titanate and tetrabutoxy titanate. Illustrative examples of the tin compounds include dibutyltin dilaurate, dibutyltin diacetate, dioctyltindicarboxylate, dimethyltindicarboxylate, and dibutyltin dioctoate. Illustrative examples of the zirconium compounds include zirconium octanoate. The moisture-cure catalysts may be employed in an amount sufficient to promote moisture-cure, which generally is from about 0.05% to about 5.00% by weight, and advantageously from about 0.5% to about 2.5% by weight. Tin octoate, dibutyltin dilaurate, tetraisopropoxy titanate and tetrabutoxy titanate are particularly desirable. U.S. Pat. No. 4,111,890 lists numerous others that are useful.

A variety of additional useful components may be added to the present inventive compositions. For example, reactive and non-reactive diluents may be added. Such diluents include, without limitation, isobornyl(meth)acrylate, dimethylacrylamide, (meth)acrylic acid and vinyltrimethoxysilane. Other useful additives include plasticizers, fillers, viscosity modifiers, flow modifiers, pigments, stabilizers, inhibitors, adjuvants, catalysts, accelerators, thixotropic agents, and combinations thereof. These additives should be present in amounts suitable to effectuate their intended purpose.

The compositions of the present invention including reactive polymers of Formula C and reinforcement polymers can be used in a variety of applications, including those where high temperature resistance is needed. Illustrative examples of such uses include automotive and general industrial applications. In one aspect, a method of using a composition of the invention includes the steps of:

a) providing a sealed container of a curable composition including at least one reactive polymer of Formulas C(I) and C(III) and reinforcement polymer, b) exposing the composition to a temperature sufficient to permit the composition to be flowable; and c) applying the composition onto a substrate and permitting the composition to cure.

In another aspect, the present invention is directed to an article of manufacture which includes two substrates bonded together by a composition including a reactive polymer of any of Formulas C(I) or C(III) and a reinforcement polymer.

Preparation of the Compositions of Formula C

The following reaction scheme depicts reactive polymers of Formula C(I) and Formula C(II), obtained from a siloxane starting material.

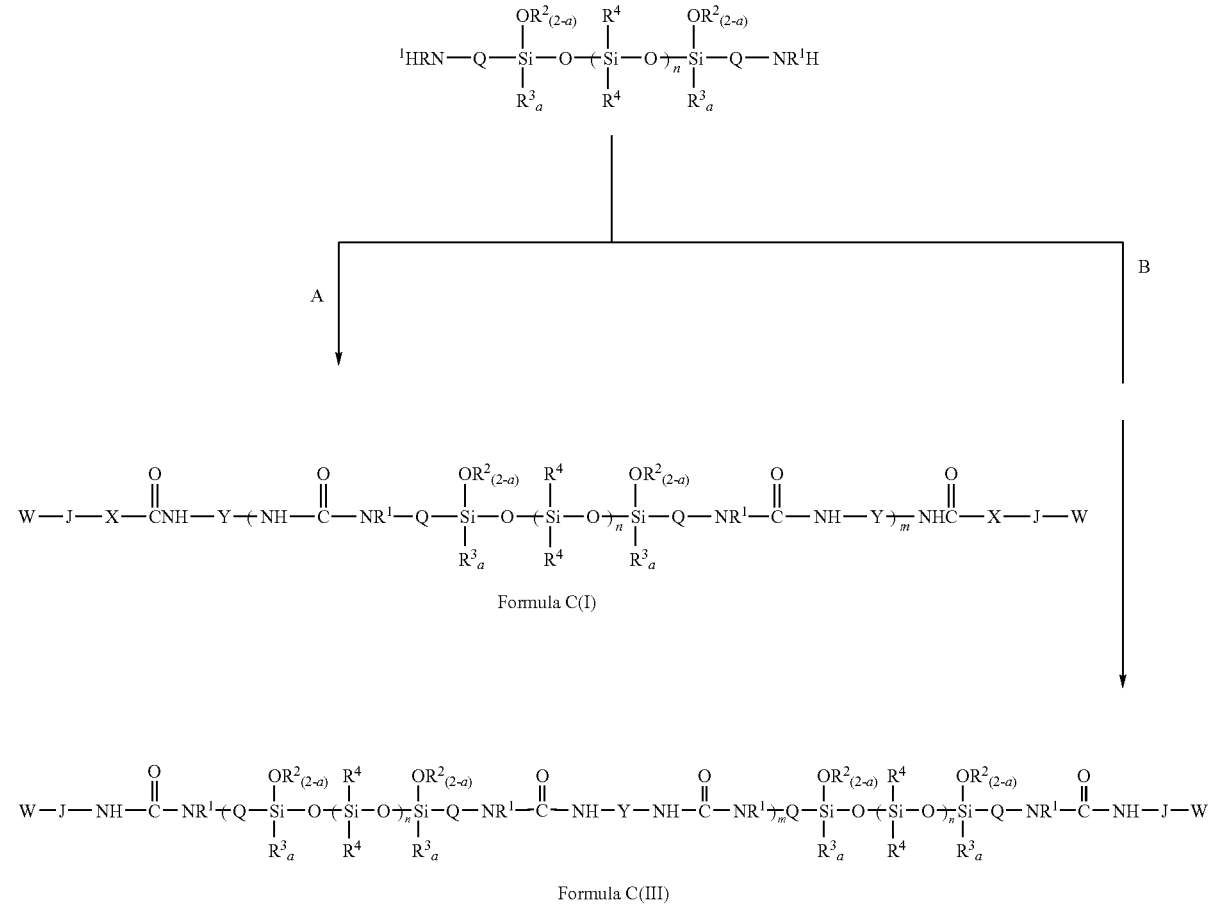

As can be seen in the above reaction scheme, the siloxane shown therein may be used to prepare reactive polymers of Formulas C(I) and C(III), via pathways A and B, respectively.

The following reaction scheme depicts a general synthetic pathway (pathway A from above) leading to formation of reactive polymers of Formula C(I). This reaction scheme generally involves simultaneous chain extension and endcapping following by endcapping with a radiation-cure group.

portion of the compositions. The siloxane may be formed as described in U.S. Pat. No. 6,750,309 B1, assigned to Henkel Corporation, which is incorporated herein in its entirety. As seen from this reference, trialkoxysilanes can be reacted with a hydroxyl terminated polydihydrocarbylsiloxane, such as polydimethylsiloxane, producing a suitable siloxane. Illustrative of the silanes used in the present invention are ethy-

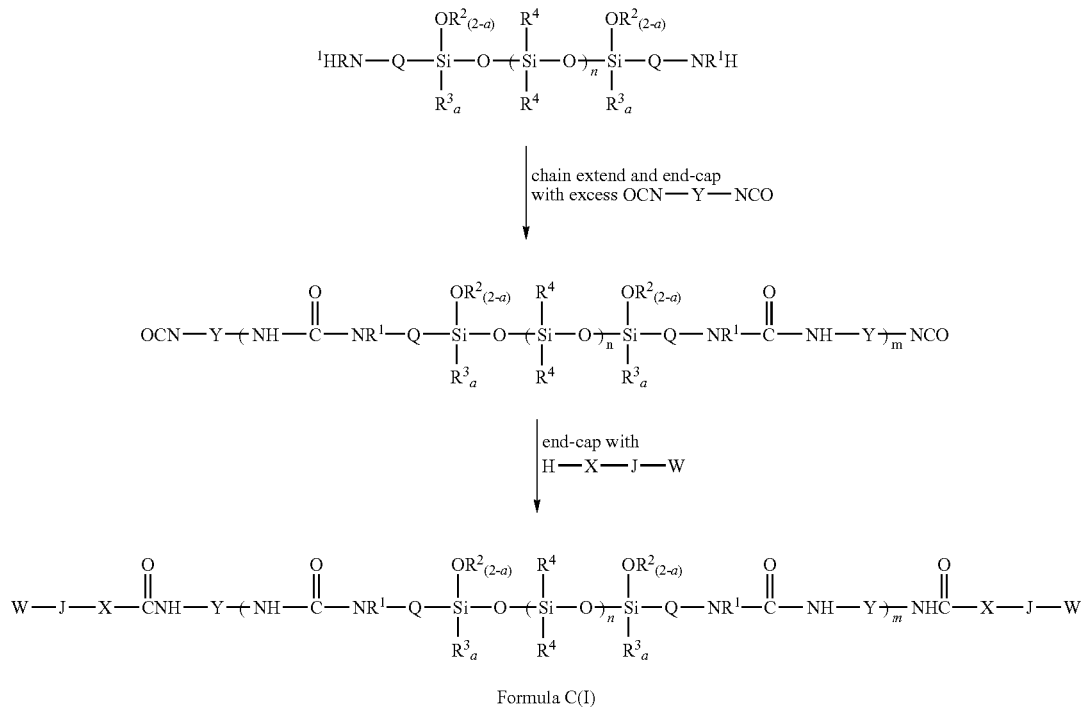

Formula C(I)

As can be seen in the above reaction scheme, reactive polymers of Formula C(I) may be prepared via pathway A by mixing:

a) a composition having the formula:

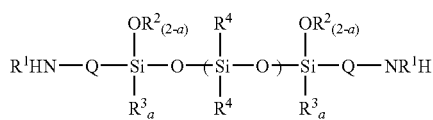

b) a compound having the structure:

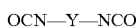

where Y is a $C_1$ to $C_{20}$ hydrocarbon diradical; and c) a compound having the formula:

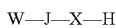

where J, Q, W, X, Y, $R^1$, $R^2$, $R^3$, $R^4$, and n are as discussed above for reactive polymers of Formula C. The reaction product of this method may be mixed with a reinforcement polymer to provide curable hot melt compositions of the present invention.

As noted above, the siloxane used in preparation of the reactive polymers of the invention provides the soft segment laminoisobutyltrimethloxysilane, butylaminopropyltrimethloxysilane, aminopropyltrimethoxysilane, and combinations thereof. Particularly useful examples of such silanes include ethylaminoisobutyltrimethoxysilane and cyclohexylaminomethyltrimethoxysilane.

The hydroxyl terminated polydihydrocarbylsiloxane is desirably chosen from those easily found commercially available. The number of repeating units, n, can be varied to achieve specific molecular weights, viscosities, and other chemical or physical properties. Generally, n is an integer such that the viscosity is from about 25 cps to about 2,500,000 cps at 25° C., such as when n is from 1 to about 1,200, and desirably from 10 to about 1,0000. The molecular weight of these siloxanes may vary and may be chosen to tailor the final product characteristics. Examples of useful molecular weights of the polyalkylsiloxanes include molecular weights of about 500 to about 50,000 atomic mass units. Advantageously, the average molecular weight of the siloxane is about 1,000 atomic mass units to about 30,000 atomic mass units.

In one aspect, the siloxane is reacted with the diisocyanate, producing the chain extended diisocyanate intermediate C(IV) shown in the above reaction scheme for pathway A. This intermediate is then end-capped on both sides, providing compounds of Formula C(I). Accordingly, the present invention relates to compositions that include a reinforcement polymer and the reaction product of:

a) a composition of Formula C(IV):

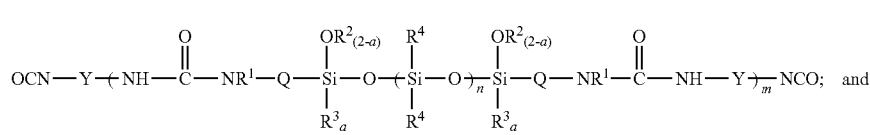

b) a compound having the structure:

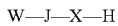

where J, Q, W, Y, $R^1$, $R^2$, $R^3$, $R^4$, a, m, and n are as discussed above for reactive polymers of Formula C.

Alternatively, the siloxane may be used to prepare reactive polymers of Formula C(III), as shown in the following reaction scheme for pathway B. This reaction scheme depicts the various pathways by which reactive polymers of Formula C(III) may be obtained.

c) a compound having the formula:

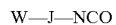

where J, Q, Y, W, $R^1$, $R^2$, $R^3$, $R^4$ a, and n are as defined above for compositions of Formula C, and mixing the reaction product with a reinforcement polymer.

The present invention also relates to compositions that include a reinforcement polymer and the reaction product of:

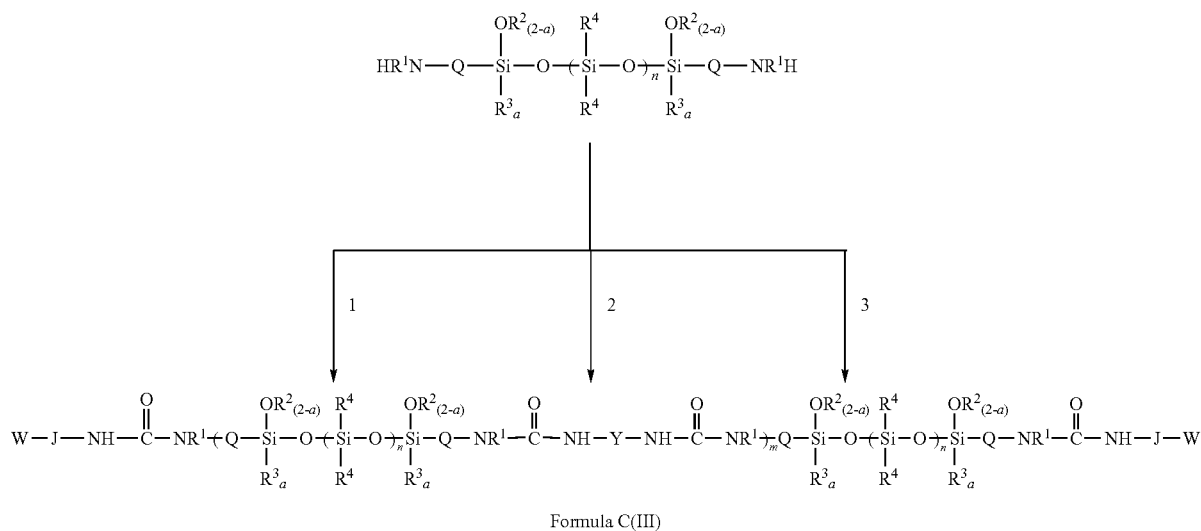

As can be seen, compositions of Formula C(III) may be prepared via three pathways, all of which use a combination of the siloxane, monoisocyanate, and diisocyanate. Path 1 involves simultaneously chain extending and end-capping the siloxane. Path 2 involves first end-capping the siloxane, followed by chain extension. Path 3 involves first chain extending the siloxane, followed by end-capping.

Accordingly, the present invention relates to a method for making a curable composition, the method including the steps of reacting:

a) a composition having the formula:

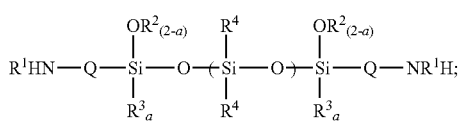

b) a compound having the structure:

OCN—Y—NCO; and a) a composition having the formula:

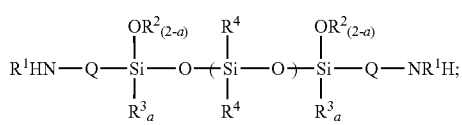

b) a compound having the structure:

OCN—Y—NCO; and c) a compound having the formula:

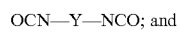

where J, Q, Y, W, $R^1$, $R^2$, $R^3$, $R^4$ a, and n are as defined above for reactive polymers of Formula C.

The monoisocyanate and diisocyanate may be used in any ratio, so long as there is provided enough monoisocyanate and diisocyanate to ensure complete reaction of the siloxane starting material. Desirably, the monoisocyanate and diisocyanate will be used in a ratio of 1:10 to 10:1. Advantageously, the monoisocyanate and diisocyanate will be used in a ratio of 50:50.

Typically, when the necessary starting materials are mixed together, reactive polymers of Formula C(III) will be produced via more than one of the pathways. However, the reaction conditions may be adjusted in order to promote one pathway over the others. For example, while the siloxane, monoisocyanate, and diisocyanate may all be mixed together simultaneously, other reaction conditions are also contemplated.

The following reaction scheme depicts the first pathway, in which the chain-extension with the diisocyanate, and end-capping of the siloxane with the monoisocyanate occurs simultaneously.

The above reaction scheme produces the intermediate composition of Formula C(V):

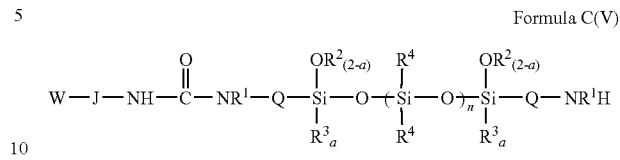

Formula C(V)

where J, $R^1$, $R^2$, $R^3$, $R^4$, Q, and W are as discussed above. This intermediate compound is then chain extended, providing compositions including Formula C(III). While such a

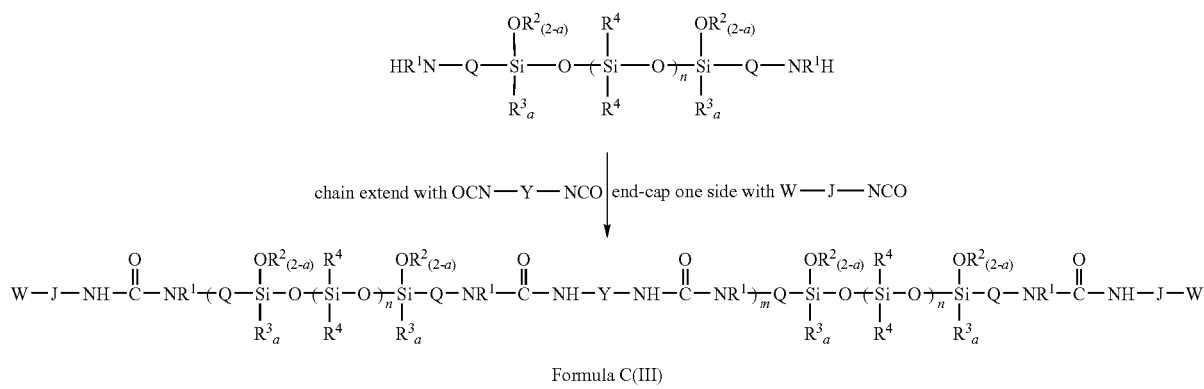

Formula C(III)

The following reaction scheme depicts the second pathway, in which the siloxane is end-capped with the monoisocyanate before any chain-extension occurs.

reaction pathway can occur when the siloxane, monoisocyanate, and diisocyanate are simultaneously mixed, it is also contemplated that the reaction pathway can occur in two

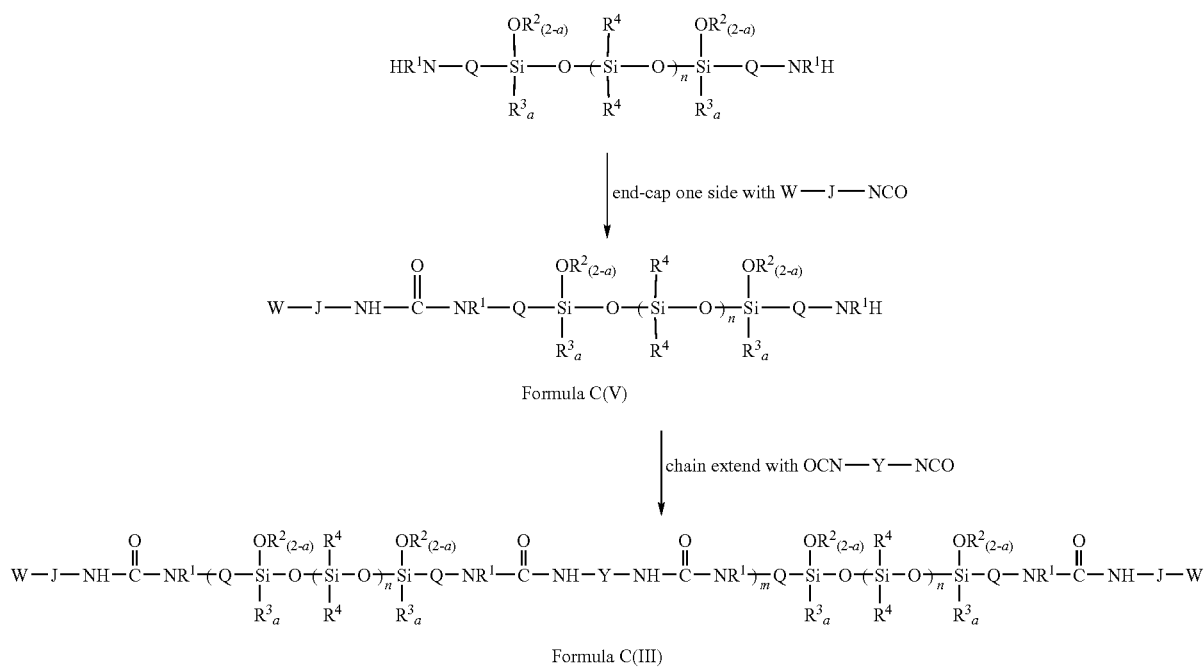

Formula C(III)

discrete steps. The siloxane may be first exposed to only the monoisocyanate, providing the compositions of Formula C(V) shown above. Accordingly, the present invention relates to compositions of Formula C(V) and methods used to make such compositions. The compositions of Formula C(V) may then be reacted with the diisocyanate, providing reactive polymers of Formula C(III).

Accordingly, the present invention relates to a method of making curable compositions, the method including the steps of reacting:

a) a composition having the formula:

Formula C(V)

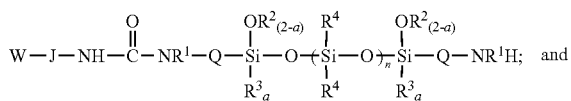

b) a compound having the structure:

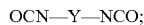
OCN—Y—NCO;

where J, Q, Y, W, $R^1$, $R^2$, $R^3$, $R^4$ a, and n are as defined above for compositions of Formula C, and mixing the reaction product with a reinforcement polymer.

The present invention also relates to compositions that include a reinforcement polymer and the reaction product of:

a) a composition having the formula:

Formula C(V)

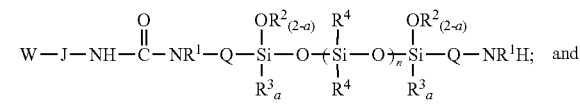

b) a compound having the structure:

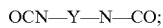
OCN—Y—N—CO;

where J, Q, Y, W, $R^1$, $R^2$, $R^3$, $R^4$ a, and n are as defined above for reactive polymers of Formula C.

The following reaction scheme depicts the third pathway, in which the siloxane is first chain extended with the diisocyanate.

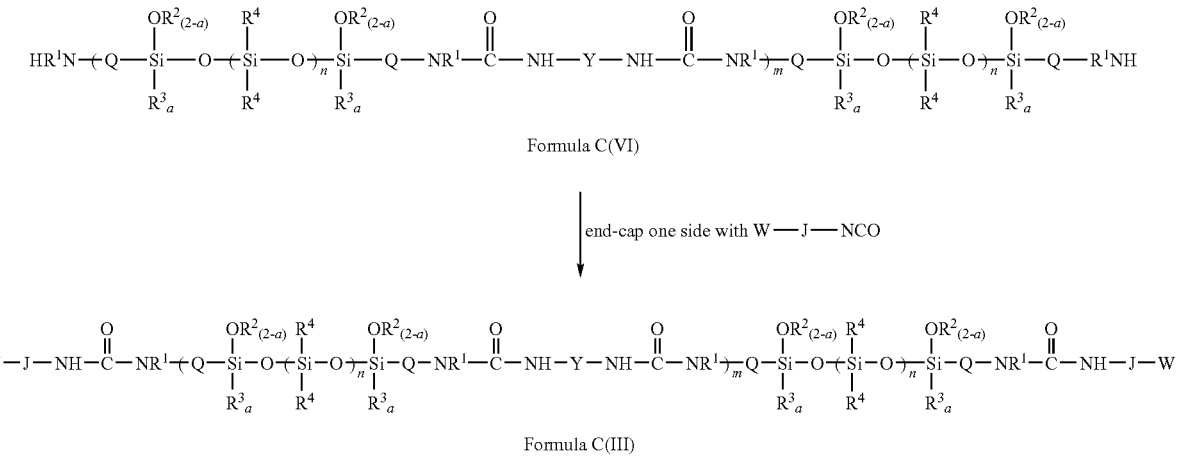

Formula C(III)

The above reaction scheme forms intermediate compositions of Formula C(VI):

Formula C(VI)

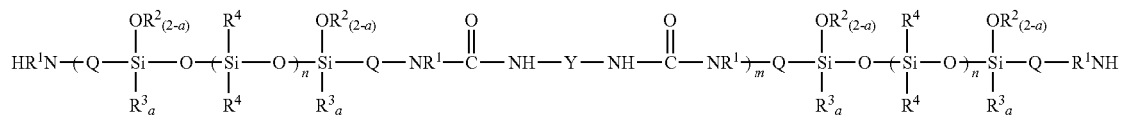

The compositions of Formula C(VI) are then end-capped with the mono-isocyanate, providing reactive polymers of Formula C(III). Accordingly, the present invention relates to a method of making compositions, the method including the steps of reacting:

a) a composition having the formula:

Formula C(VI)

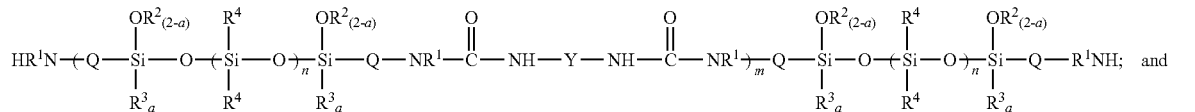

b) a compound having the formula:

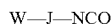

where J, Q, Y, W, $R^1$, $R^2$, $R^3$, $R^4$ a, and n are as defined above for compositions of Formula C, and mixing the reaction product with a reinforcement polymer.

The present invention also relates to compositions that include a reinforcement polymer and the reaction product of:

a) a composition having the formula:

Formula C(VI)

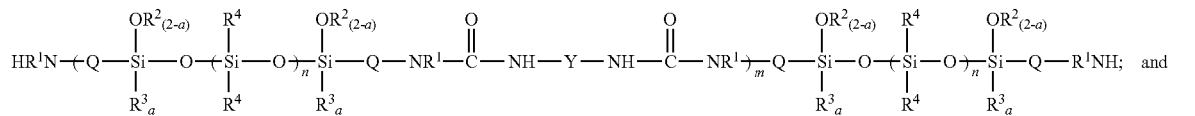

b) a compound having the formula:

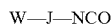

where J, Q, Y, W, $R^1$, $R^2$, $R^3$, $R^4$ a, and n are as defined above for compositions of Formula C.

EXAMPLES

The following examples provide specific illustrations of various aspects of the present invention. In no way should the invention be construed as being limited to these particular examples.

(I) Synthesis of Silicone Urea Copolymer A (A) Synthesis of Aminopropyldimethoxysilyl Terminated Polydimethylsiloxane Fluid A In a mixer was charged with 4,800 g of a 40 cps silanol terminated polydimethylsiloxane (Dow Corning 4-2737 PA fluid). The content was heated to 100° C. under vacuum for 1 hour to remove the moisture. After cooling, 1,753 g of aminopropyltrimethoxysilane was added. The mixture was heated to 50° C. under the vacuum to remove the methanol thus formed. The fluid contains 1.57 meq amine/g.

(B) Synthesis of Silicone Urea Copolymer A

In a 4-neck 1-L reaction kettle equipped with a thermocouple, a mixing blade and a nitrogen inlet were charged with 300 g of fluid A. A mixture containing 36.5 g of octadecylisocyanate and 26.14 g of isophorone diisocyanate was slowly added to the vigorously stirred fluid A. During addition, the viscosity of the reaction mixture slowly increased. The temperature of the reacting mixture was slowly raised to keep the viscosity low. The final temperature when all the isocyanate was added was 120° C. The copolymer was a hazy solid at room temperature but readily melted upon heating.

(II) Synthesis of Silicone Urea Copolymer B (A) Synthesis of Aminopropyldimethoxysilyl Terminated Polydimethylsiloxane Fluid B In a mixer was charged with 5,000 g of a 750 cps silanol terminated polydimethylsiloxane. The content was heated to 100° C. under vacuum for 1 hour to remove the moisture. After cooling, 149.17 g of aminopropyltrimethoxysilane was added. The mixture was heated to 70° C. under the vacuum to remove the methanol thus formed. The fluid contains 0.135 meq amine/g.

(B) Synthesis of Silicone Urea Copolymer B

In a 4-neck 1-L reaction kettle equipped with a thermocouple, a mixing blade and a nitrogen inlet were charged with 300 g of fluid B. A mixture containing 3.14 g of octadecylisocyanate and 2.25 g of isophorone diisocyanate was slowly added to the vigorously stirred fluid B. During addition, the viscosity of the reaction mixture slowly increased. The temperature of the reacting mixture was slowly raised to keep the viscosity low. The final temperature when all the isocyanate was added was 120° C. The copolymer was a clear viscous semi solid at room temperature but can be melted to flow upon heating to 120° C.

(III) Synthesis of Silicone Urea Copolymer C (A) Synthesis of Aminopropyldimethoxysilyl Terminated Polydimethylsiloxane Fluid C In a mixer was charged with 5,000 g of a 3,500 cps silanol terminated polydimethylsiloxane. The content was heated to 100° C. under vacuum for 1 hour to remove the moisture. After cooling, 62.65 g of aminopropyltrimethoxysilane was added. The mixture was heated to 70° C. under the vacuum to remove the methanol thus formed. The fluid contains 0.065 meq amine/g.

(B) Synthesis of Silicone Urea Copolymer C

In a 4-neck 1-L reaction kettle equipped with a thermocouple, a mixing blade and a nitrogen inlet was charged with 500 g of fluid C. A mixture containing 2.77 g of octadecylisocyanate and 1.62 g of isophorone diisocyanate was slowly added to the vigorously stirred fluid C. During addition, the viscosity of the reaction mixture slowly increased. The temperature of the reacting mixture was slowly raised to keep the viscosity low. The final temperature when all the isocyanate was added was 120° C. The copolymer was a clear viscous semi solid at room temperature but can be melted to flow upon heating to 120° C.

Solutions of the following polymers were prepared: Vamac G (28.4% in toluene), Kraton FG 1924x (32.4% in toluene), Kraton FP 1901x (24.8% in toluene), Neoprene (28.4% in toluene), Wacker Geniomer 80 (28.5% in propyl acetate), styrene butadiene (SB) copolymer (33.3% in toluene) and polystyrene (PS) (64% in toluene).

Example 1

Reinforcement of Silicone Urea Copolymer A by Various Polymers

Various solutions prepared above were blended with silicone urea copolymer A (A) in solid ratios of 3:1 or 1:3 respectively. To the polymer blend was further added 0.1% dioctyltindicarboxylate based on the total weight of the solids. The solvent was allowed to evaporate and test sheets were prepared. The test sheets were further allowed to undergo moisture cure in a 30° C. 50% humidity chamber for 7 days. After cure, the tensile strength and elongation of each test specimen were determined. The results for each composition are shown in Table 1 below.

TABLE 1

Physical Properties of Polymer Blend with Copolymer A

| | A | A: Vamac G = 3:1 | A: Vamac G = 1:3 | A: Kraton FP1901 = 3:1 | A: Kraton FP1901 = 1:3 | A: Kraton FP1924 = 3:1 | A: Kraton FP1924 = 1:3 | A: Neoprene = 1:3 | A:SB = 3:1 | A:PS = 3:1 |
|---|---|---|---|---|---|---|---|---|---|---|
| Shore A | 93 | 48 | 57 | 78 | 91 | 65 | 58 | 73 | 84 | 88 |
| Tensile (psi) | 319 | 244 | 198 | 607 | 915 | 234 | 1021 | 607 | 288 | 79 |
| Elongation (%) | 23 | 265 | 554 | 120 | 230 | 13 | 455 | 396 | 9 | 4 |

As can be seen from the results above, addition of a reinforcement polymer to the silicone urea polymer and varying the ratios of the components, allows for tailoring of the physical properties of the hot melt composition, such as hardness, tensile strength and elongation.

Example 2

Reinforcement of Silicone Urea Copolymer B by Various Polymers

Solutions of the various polymers were further blended with silicone urea copolymer B (B). To the polymer blend was further added 0.1% dioctyltindicarboxylate based on the total weight of the solids. The solvent was allowed to evaporate and test sheets were prepared. The test sheets were further allowed to undergo moisture cure in a 30° C. 50% humidity chamber for 7 days. After cure, the tensile strength and elongation of each test specimen were determined. The results for each composition are shown in Table 2 below.

TABLE 2

Physical Properties of Polymer Blend with Copolymer B

| | B | B: Vamac G = 3:1 | B: Kraton FP1901 = 3:1 | B: Kraton FP1901 = 1:3 | B: Kraton FP1924 = 3:1 | B: Kraton FP1924 = 1:3 | B: Neoprene = 3:1 | B:Geniomer 80 = 3:1 | B:SB = 3:1 |
|---|---|---|---|---|---|---|---|---|---|
| Shore A | 30 | 32 | 36 | 47 | 34 | 21 | 30 | 30 | 30 |
| Tensile (psi) | 74 | 58 | 210 | 978 | 120 | 430 | 58 | 154 | 63 |
| Elongation (%) | 122 | 139 | 195 | 327 | 143 | 550 | 29 | 284 | 64 |

As can be seen from the results above, addition of a reinforcement polymer to the silicone urea polymer and varying the ratios of the components, allows for tailoring of the physical properties of the hot melt composition, such as hardness, tensile strength and elongation.

Example 3

Reinforcement of Silicone Urea Copolymer C by Various Polymers

Solutions of the various polymers were further blended with silicone urea copolymer C (C). To the polymer blend was further added 0.1% dioctyltindicarboxylate based on the total weight of the solids. The solvent was allowed to evaporate and test sheets were prepared. The test sheets were further allowed to undergo moisture cure in a 30° C. 50% humidity chamber for 7 days. After cure, the tensile strength and elongation of each test specimen were determined. The results for each composition are shown in Table 3 below.

TABLE 3

Physical Properties of Polymer Blend with Copolymer C

| | C | C: Vamac G = 3:1 | C: Kraton FP1901 = 3:1 | C: Kraton FP1901 = 1:3 | C: Kraton FP1924 = 3:1 | C: Kraton FP1924 = 1:3 | C: Neoprene = 3:1 | C: Neoprene = 1:3 | C: Geniomer 80 = 3:1 | C:SB = 3:1 |
|---|---|---|---|---|---|---|---|---|---|---|
| Shore A | 16 | 16 | 36 | 72 | 32 | 53 | 25 | 46 | 13 | 22 |
| Tensile (psi) | 20 | 76 | 177 | 1170 | 115 | 474 | 85 | 397 | 128 | 64 |
| Elongation (%) | 126 | 470 | 260 | 542 | 233 | 588 | 272 | 680 | 435 | 226 |

As can be seen from the results above, addition of a reinforcement polymer to the silicone urea polymer and varying the ratios of the components, allows for tailoring of the physical properties of the hot melt composition, such as hardness, tensile strength and elongation.

Example 4

Heat Aging of the Polymer Blends

The cured polymer blends of copolymers A, B and C with Kraton FP 1901x and Kraton FG 1924x were further subjected to heat aging at 150° C. for 3 days. Weight losses after heat again ranging from 0.55-1.14% were observed.

What is claimed is:
1. A curable hot melt composition comprising:
  a) at least one of
    i) a reactive polymer of Formula C(I):

Formula C(I)

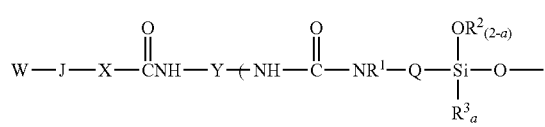

-continued

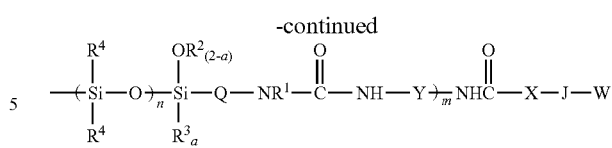

wherein:
R$^1$ in each occurrence may be the same or different and is a member selected from the group consisting of H and a C$_1$ to C$_{10}$ hydrocarbon radical;
R$^2$ in each occurrence may be the same or different and is a C$_1$ to C$_{10}$ hydrocarbon radical;
R$^3$ in each occurrence may be the same or different and is a C$_1$ to C$_{10}$ hydrocarbon radical;
R$^4$ in each occurrence may be the same or different and is a C$_1$ to C$_{10}$ hydrocarbon radical;
J in each occurrence may be the same or different and is a C$_1$ to C$_{10}$ hydrocarbon diradical;
X in each occurrence can be the same or different and is a member selected from the group consisting of O, S, and NR$^{10}$,
  wherein R$^{10}$ in each occurrence may be the same or different and is a member selected from the group consisting of H and a C$_1$ to C$_{10}$ hydrocarbon radical;
Y in each occurrence may be the same or different and is a C$_1$ to C$_{20}$ hydrocarbon diradical;
W in each occurrence may be the same or different and is C$_2$ to C$_{10}$ radical containing at least one of: a carbon to carbon double bond, a carbonyl group, or an epoxide group;
Q in each occurrence may be the same or different and is a C$_1$ to C$_{10}$ hydrocarbon diradical;
n in each occurrence may be the same or different and is 1 to about 1,200;
m is 1 to about 100; and
a in each occurrence may be the same or different and is 0 or 1;
  ii) a reactive polymer of Formula C(III):

Formula C(III)

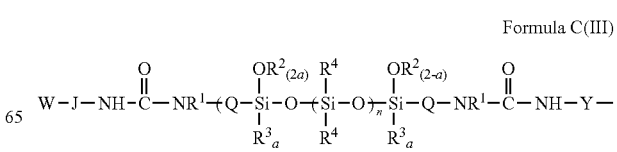

-continued

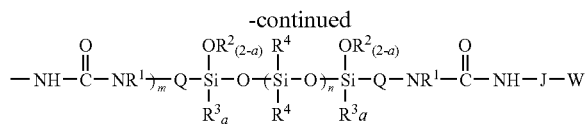

wherein:
- J in each occurrence may be the same or different and is a $C_1$ to $C_{10}$ hydrocarbon diradical;
- Y in each occurrence may be the same or different and is a $C_1$ to $C_{20}$ hydrocarbon diradical;
- W in each occurrence may be the same or different and is a $C_2$ to $C_{10}$ radical containing at least one of: a carbon to carbon double bond, a carbonyl group, or an epoxide group;
- Q in each occurrence may be the same or different and is a $C_1$ to $C_{10}$ hydrocarbon diradical;
- $R^1$ in each occurrence may be the same or different and is a member selected from the group consisting of H and a $C_1$ to $C_{10}$ hydrocarbon radical;
- $R^2$ in each occurrence may be the same or different and is a $C_1$ to $C_{10}$ hydrocarbon radical;
- $R^3$ in each occurrence may be the same or different and is a $C_1$ to $C_{10}$ hydrocarbon radical;
- $R^4$ in each occurrence may be the same or different and is a member selected from the group consisting of H and a $C_1$ to $C_{10}$ hydrocarbon radical;
- n in each occurrence may be the same or different and is 1 to about 1,200;
- m is 1 to about 100; and
- a in each occurrence may be the same or different and is 0 or 1;

iii) the reaction product of:
a. a composition of Formula C(IV):

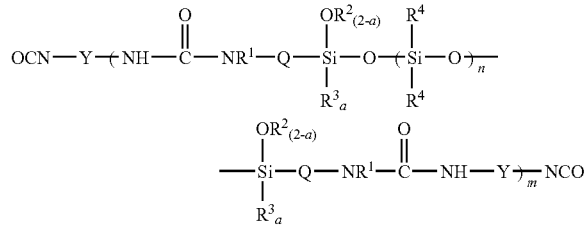

Formula C(IV)

wherein:
- Y in each occurrence may be the same or different and is a $C_1$ to $C_{20}$ hydrocarbon diradical;
- Q in each occurrence may be the same or different and is a $C_1$ to $C_{10}$ hydrocarbon diradical;
- $R^1$ in each occurrence may be the same or different and is a member selected from the group consisting of H and a $C_1$ to $C_{10}$ hydrocarbon radical;
- $R^2$ in each occurrence may be the same or different and is a $C_1$ to $C_{10}$ hydrocarbon radical;
- $R^3$ in each occurrence may be the same or different and is $C_1$ to $C_{10}$ hydrocarbon radical;
- $R^4$ in each occurrence may be the same or different and is a $C_1$ to $C_{10}$ hydrocarbon radical;
- n in each occurrence may be the same or different and is 1 to about 1,200;
- m is 1 to about 100; and
- a in each occurrence may be the same or different and is 0 or 1;

b. a compound having the structure:

W—J—X—H wherein:
- J in each occurrence may be the same or different and is a $C_1$ to $C_{10}$ hydrocarbon diradical;
- X in each occurrence may be the same or different and is a member selected from the group consisting of O, S, and $NR^{10}$, wherein $R^{10}$ in each occurrence may be the same or different and is a member selected from the group consisting of H and a $C_1$ to $C_{10}$ hydrocarbon radical;
- W in each occurrence may be the same or different and is $C_2$ to $C_{10}$ radical containing at least one of: a double bond, a carbonyl group, or an epoxide group;

iv) the reaction product of:
a. a composition of Formula C(V):

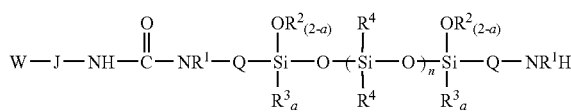

Formula C(V)

wherein:
- J in each occurrence may be the same or different and is a $C_1$ to $C_{10}$ hydrocarbon diradical;
- W is a $C_2$ to $C_{10}$ radical containing at least one of: a carbon to carbon double bond, a carbonyl group, or an epoxide group;
- Q in each occurrence may be the same or different and is a $C_1$ to $C_{10}$ hydrocarbon diradical;
- $R^1$ in each occurrence may be the same or different and is a member selected from the group consisting of H and a $C_1$ to $C_{10}$ hydrocarbon radical;
- $R^2$ in each occurrence may be the same or different and is a $C_1$ to $C_{10}$ hydrocarbon radical;
- $R^3$ in each occurrence may be the same or different and is a $C_1$ to $C_{10}$ hydrocarbon radical;
- $R^4$ in each occurrence may be the same or different and is a $C_1$ to $C_{10}$ hydrocarbon radical; and
- n in each occurrence may be the same or different and is 1 to about 1,200; and b. a compound having the structure:

OCN—Y—NCO wherein Y is a $C_1$ to $C_{20}$ hydrocarbon diradical; and
b) a reinforcement polymer.

2. The composition of claim 1, wherein said reinforcement polymer comprises at least one monomer selected from the group consisting of (meth)acrylate ester monomers, alkylene monomers, isocyanate monomers, ethylene/acrylic polymers, polydimethylsiloxane/urea polymers, styrene-butadien-styrene polymers, styrene-ethylene/propylene-styrene polymers, polychloroprene polymers and combinations thereof.

3. The composition of claim 1, wherein said diisocyanate is selected from the group consisting of isophorone diisocyanate, hexamethylene diisocyanate, and 1,3-bis(cyanatomethyl)cyclohexane.

* * * * *